US009918322B2

(12) United States Patent
Sharma et al.

(10) Patent No.: US 9,918,322 B2
(45) Date of Patent: Mar. 13, 2018

(54) RADIO RESOURCES MANAGEMENT SYSTEM

(71) Applicant: embedUR systems, Inc., Fremont, CA (US)

(72) Inventors: Abhishek Sharma, Streamwood, IL (US); John Marconi, Hoffman Estates, IL (US); John-Mark Patterson, Mt Prospect, IL (US)

(73) Assignee: embedUR systems, Inc., Fremont, CA (US)

( * ) Notice: Subject to any disclaimer, the term of this patent is extended or adjusted under 35 U.S.C. 154(b) by 294 days.

(21) Appl. No.: 14/720,967

(22) Filed: May 25, 2015

(65) Prior Publication Data
US 2015/0341939 A1 Nov. 26, 2015

Related U.S. Application Data

(60) Provisional application No. 62/002,636, filed on May 23, 2014, provisional application No. 62/002,629, (Continued)

(51) Int. Cl.
*H04W 72/04* (2009.01)
*H04W 72/08* (2009.01)
(Continued)

(52) U.S. Cl.
CPC ........... *H04W 72/08* (2013.01); *H04W 24/08* (2013.01); *H04W 28/16* (2013.01);
(Continued)

(58) Field of Classification Search
CPC ..... H04W 16/10; H04W 84/12; H04W 16/18; H04W 28/16; H04W 28/00; H04W 28/02; H04W 28/0247; H04W 28/0252; H04W 28/26; H04W 28/0236; H04W 72/0426; H04W 72/0433; H04W 72/08;
(Continued)

(56) References Cited

U.S. PATENT DOCUMENTS 8,886,126 B2 * 11/2014 Mantravadi ........... H04W 88/06
370/318
9,351,197 B2 * 5/2016 Yacovitch ............. H04W 28/12
(Continued)

*Primary Examiner* — Jae Y Lee
*Assistant Examiner* — Aixa Guadalupe-Cruz
(74) *Attorney, Agent, or Firm* — Fenwick & West LLP

(57) ABSTRACT

A radio resource management (RRM) system and method manages radio resources in a wireless network of radio access points (APs). In some embodiments, the channel and/or frequency of radios of the APs are managed based on a prioritization scheme of the radios. In some embodiments, the transmit powers of the radios are managed based on the prioritization scheme. The priorities of the radios is partially based on the priorities of clients connected to the radios. In some embodiments, the RRM system is a centralized controller system. In some embodiments, the RRM system forms a hierarchical network of child and parent nodes. The parent nodes are configured to manage the radios associated with the parent and its child nodes. The parent node with the smallest number of child nodes, which are associated with the selected radio and its neighboring radios, is managing these radios.

29 Claims, 16 Drawing Sheets

Related U.S. Application Data filed on May 23, 2014, provisional application No. 62/002,632, filed on May 23, 2014.

(51) Int. Cl.

| | |
|---|---|
| *H04W 28/16* | (2009.01) |
| *H04W 72/10* | (2009.01) |
| *H04W 24/08* | (2009.01) |
| *H04W 52/44* | (2009.01) |
| *H04W 52/24* | (2009.01) |
| *H04W 52/28* | (2009.01) |
| *H04W 52/14* | (2009.01) |

(52) U.S. Cl.
CPC ......... *H04W 52/243* (2013.01); *H04W 52/28* (2013.01); *H04W 52/44* (2013.01); *H04W 72/0426* (2013.01); *H04W 72/085* (2013.01); *H04W 72/10* (2013.01); *H04W 52/143* (2013.01)

(58) Field of Classification Search
CPC ..... H04W 72/00; H04W 72/04; H04W 72/06; H04W 72/12
See application file for complete search history.

(56) References Cited

U.S. PATENT DOCUMENTS

| | | | |
|---|---|---|---|
| 2010/0173653 A1* | 7/2010 | Catovic | H04W 72/02 455/464 |
| 2014/0036787 A1* | 2/2014 | Ganu | H04W 16/10 370/329 |

* cited by examiner

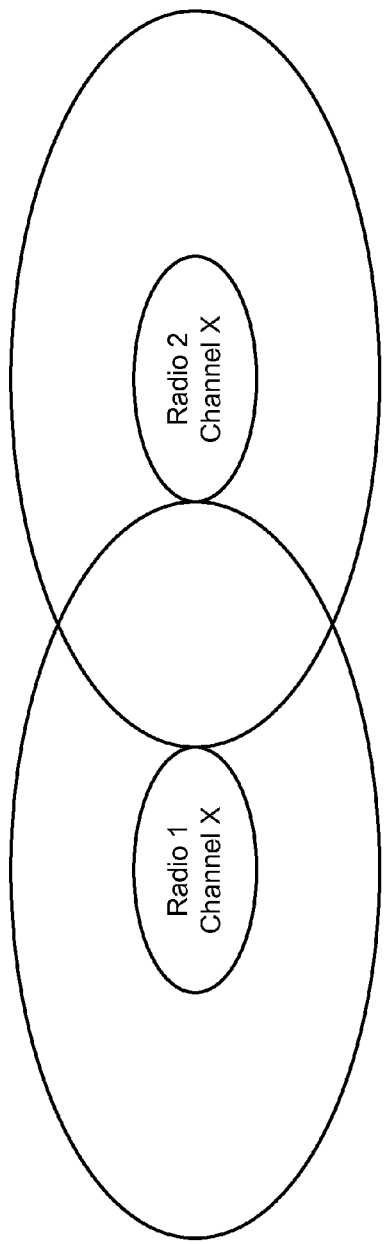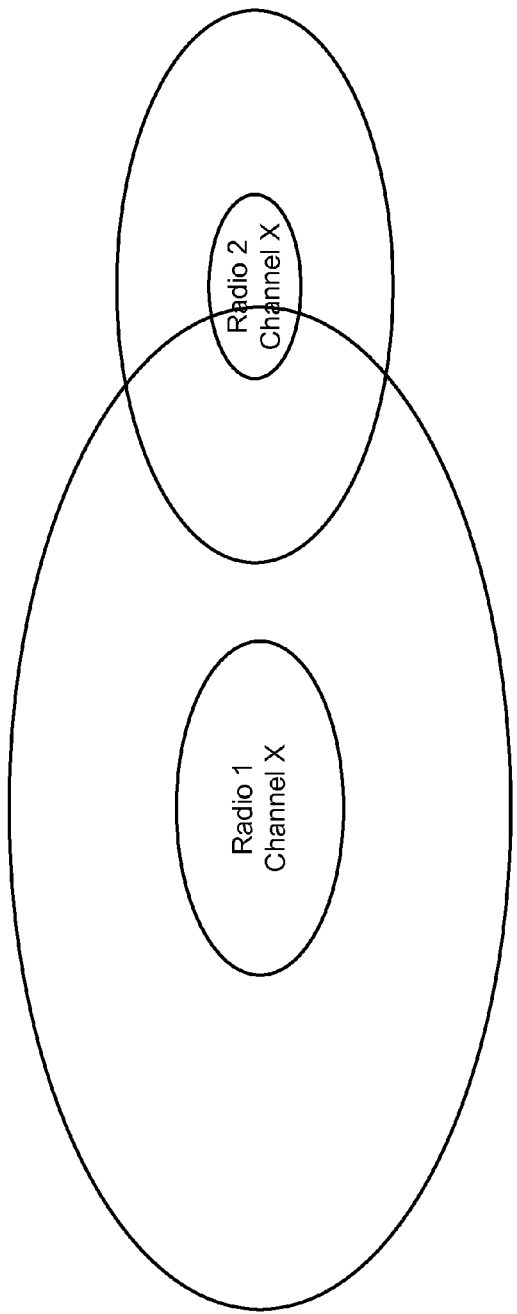
FIG. 8A
FIG. 8B

RADIO RESOURCES MANAGEMENT SYSTEM

CROSS REFERENCE TO RELATED APPLICATIONS

The application claims the benefit of Provisional Application No. 62/002,629, filed on May 23, 2014, of Provisional Application No. 62/002,632, filed on May 23, 2014, and of Provisional Application No. 62/002,636, filed on May 23, 2014, the contents of which are incorporated herein by reference.

BACKGROUND

1. Field of Art

The disclosure generally relates to the field of wireless radio networks, and in particular, to managing radio channels, radio frequencies and transmit powers in centralized or hierarchical radio networks.

2. Description of the Related Art

In wireless radio networks, e.g., 802.11 WiFi networks, radio resources are generally limited. For example, the radio spectrum of a network is limited to ranges of frequencies and transmit powers. This includes that frequency ranges are divided into sub-ranges (or channels) to ensure a more orderly usage and fixed data bandwidths. In some cases, the channels are grouped together to allow higher data bandwidths by using them simultaneously.

When deploying wireless radio networks, the goal is to achieve the maximum coverage area, maximum bandwidth, and minimum levels of interference among the radios of the network. Types of interferences include interferences from unknown sources, e.g., microwave ovens or cordless phones, interferences from other non Wi-Fi radios using the same network protocol, and interferences from known radios that are part of the wireless radio network.

In home WiFi radio deployments, one or more radios independently scan available radio frequencies at startup, or while running, to determine the optimal frequency/channel and transmit power of operation. A WiFi radio processor then configured the radio with these optimal settings based on the data received during the independent frequency scans. In enterprise WiFi radio deployments, radios send operational data to a centralized controller system, which processes the data from all the radios to determine the optimal frequency/channel and transmit power for each individual radio.

A centralized controller system can receive data on interference, network performance, and analyze which radios are in the range of other radios known to the controller system. The centralized controller system then configures each radio with the determined frequency/channel and transmits power based on the data to improve the bandwidth and reliability of the network.

Several implementations of 802.11 WiFi controllers exist that manage radios through radio access points (APs) that are part of the wireless network. While every implementation attempts to optimize each radio to avoid interference and contention with other AP radios, these implementations do not distinguish between the AP radios when managing radio resources of these radios.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

Figure (FIG.) 1 illustrates a network of radio access points (APs), including radios, and a radio resources management (RRM) system for managing the radio resources of APs, according to some embodiments.

FIGS. 8A and 8B illustrate a RRM system including signal maps of a plurality of radios operating on the same frequency channel, according to some embodiments.

Figure 1:
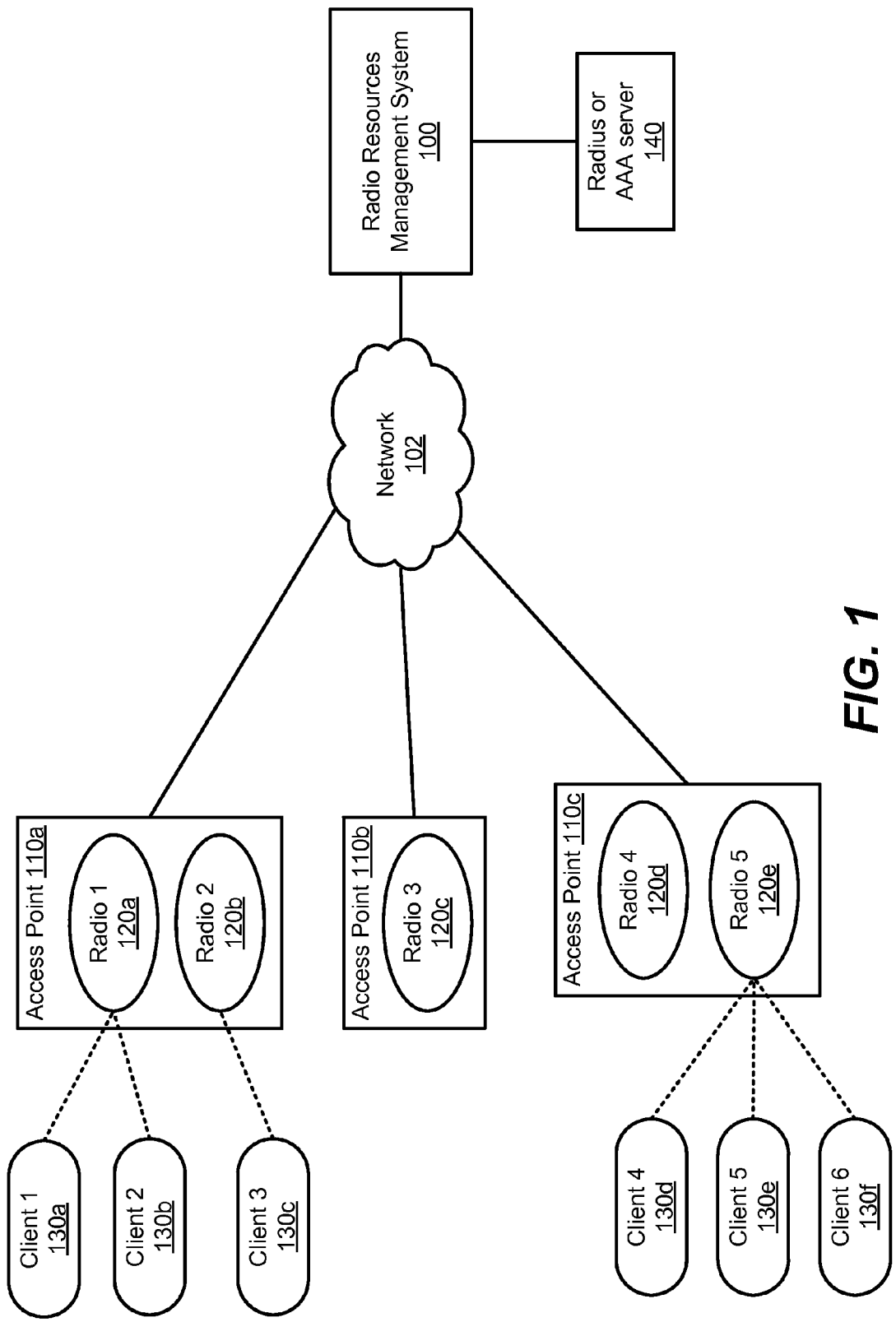

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein. Although the figures only show one of each type of network component, computing module or radio component, in practice, many types of these modules and components exist, and the various types of modules and components communicate with each other on a frequent basis.

Configuration Overview

A system, method and computer-readable storage medium that includes a radio resources management (RRM) system for managing radio resources, including radio channels, frequency assignments, and radio transmit powers, in a wireless network. The wireless network includes a plurality of radio access points (APs) having radios with each radio wirelessly connected to one or more client devices. Some embodiments of the RRM system employ a prioritization scheme of the radios included in the network to manage the radio resources. Employing a prioritization scheme allows higher priority radios, clients, and networks to achieve increased coverage, better utilized bandwidth, and decreased interference levels. In some embodiments, the RRM system includes an embedded computing system. A "channel" as used herein refers to a radio channel and/or the corresponding frequency or frequencies of the channel, unless stated otherwise. The terms "radio" and "AP radio" are used interchangeably, unless otherwise stated. The terms "access point" and "radio access point" are used interchangeably, unless otherwise stated.

In some embodiments, the RRM system includes either a hierarchical network of radio-resource managing node or a centralized system, which reduces the cost and complexity of managing the resources to the AP radios while improving bandwidth and network reliability as compared to each AP being stand-alone and managing its radios by itself. In turn, the radio access points are connected to the RRM system via a network. In some embodiments, the RRM system is a centralized system that manages all the radio access points included in the network. In some embodiments, the RRM system forms a hierarchical network of parent and child nodes, distributing the management power to lowest parent nodes in the hierarchy for managing all network radios that have overlapping coverage area.

In some embodiments, the system and method for managing radio channels in a wireless network of radio APs that include radios comprise the following steps. Managing the radio channels is based at least partially on the priorities of the AP radios. The method includes first selecting at least one radio of a radio access point. The at least one selected radio operates on a current channel. For each selected radio, the method includes determining all within-range radios of the radio APs by scanning channels of the selected radio for signals from other radios of the radio APs. The next step includes determining the priorities of the selected radio and all within-range radios. In the method, a performance measure is calculated for each channel of the selected radio. The performance measure is based at least partially on the priority of the selected radio and the priorities of the within-range radios. Furthermore, the cost of changing the current channel to a new channel of the selected radio is calculated with the new channel having a performance measure that exceeds the performance measure of the current channel. Upon determining that the performance measure of the new channel exceeds the cost of changing the current channel to the new channel, a request for changing the current channel to the new channel is sent to the radio access point of the selected radio.

In some embodiments, the system and method for managing radio transmit powers in a wireless network of radio APs that include radios comprise the following steps. Managing the radio transmit powers is based at least partially on the priorities of the AP radios. The method includes first selecting at least one radio of a radio access point. The selected radio operates on a current channel with a current transmit power. For each selected radio, the method includes determining all within-range radios by scanning the current channel of the selected radio for signals from radios of the radio access points. The method further includes determining priorities of the selected radio and of the within-range radios, processing at least one of the within-range radios. For each processed within-range radio, in response to the priority of the selected radio exceeding the priority of the processed within-range radio, an amount by which to increase the current transmit power of the selected radio is determined. For each processed within-range radio, in response to the priority of the processed within-range radio exceeding the priority of the selected radio, an amount by which to decrease the current transmit power of the selected radio is determined. Upon the determined amount exceeding zero, the method includes sending a request for changing the current transmit power of the selected radio by the determined amount.

In some embodiments, managing radio resources is based on historical data received from the radios included in network. In some embodiments, the system and method includes averaging performance measures or increases/decreases in transmit powers over an extended time period to determine future channel changes or future increase/decreases in transmit powers. In some embodiments, the system and method considers recent channel changes to avoid repeated channel changes to the same reoccurring channels. In some embodiments, the system and method considers recent increases/decreases in transmit powers to avoid fluctuating transmit power changes by subsequent increases and decreases in transmit power.

In some embodiments, the system and method for managing radio resources in a wireless network comprising a plurality of radios includes the following steps. Embodiments of the system and method include forming a hierarchy comprising a plurality of nodes. One step of forming the hierarchy includes generating a tree structure having a root node and at least one node of the plurality of nodes connected to the root node. Another step of forming the hierarchy includes assigning each node to be a child node or a parent node. Each parent node of the hierarchy is configured to manage radio resources of a child node connected to the parent node of the child node. Furthermore, a step of forming the hierarchy includes associating each radio of the wireless network to one node of the plurality of nodes. The method further includes selecting a radio of the wireless network, and determining all neighboring radios of the wireless network that are within range of the selected radio by scanning the channels of the selected radio for signals from the neighboring radios. In response to determining all neighboring radios of the selected radio, all parent nodes associated with the selected radio and with all neighboring radios are identified. One node from all the identified parent nodes is selected so that the selected parent node has the smallest number of child nodes among all identified parent nodes. The radio resources of the selected radio and all neighboring radios are then managed through the selected parent node.

Radio Resources Management System

FIG. 1 illustrate a network of radio access points 110 that include one or more radios 120 and a radio resources management (RRM) system 100 for managing the radio resources of radio access points (APs) 110, according to some embodiments. The RRM system 100 facilitates managing radio resources, including, for example the channels, frequencies and transmit powers used by an AP's radios based on the radios' priorities that are determined by the RRM system 100. In some embodiments, the RRM system 100 controls radio channel, frequency and transmit power based on interference and non-interference related priorities to allow higher priority radios 120, clients 130, and networks to achieve better coverage, bandwidth, and interference levels. For example, the RRM system 100 assigns a unique channel and frequency to a high priority radio or increases the radio's transmit power, while low priority radios share the remaining channels and frequencies or transmit at a reduced power. In some embodiments, the control of RRM system 100 over APs 110 and radios 120 is centralized in a RRM server running a RRM system application. In some embodiments, the control over Aps 110 and radios 120 is distributed over the network with the RRM system 100 managing AP gateways that manages one or more APS 110.

Each radio 120 of AP 110 wirelessly communicates to one or more clients 130, as indicated by the dashed lines in FIG. 1. Each AP 110 also communicates through a network 102 to the RRM system 110 that manages the radio resources of each AP 110 and its radios 120. Each AP 110, in turn, controls the properties and resources of its radios 120 as instructed by the RRM system 110. In some embodiments, as shown in FIG. 1, the RRM system 100 communicates with a Remote Authentication Dial In User Service (RADIUS) or Authentication, Authorization, and Accounting (AAA) management server 140 for controlling access and authentication to the network, which includes network 102 and the wireless network formed by the APs 110, radios 120, and clients 130. In this network, the RRM system 100, the APs 110, the radios 120, the clients 130, and the RADIUS or AAA management server 140 are all communicatively coupled through communication protocols (e.g., the internet, WiFi, 3G, 4G or LTE protocol), with the communication connections shown as lines in FIG. 1. In some embodiments, the RADIUS server or AAA server communicate the radio resources, including the client priorities and service type parameters to the RRM system during authentication. In some embodiments, the network forms a local area network, a wide area network, a metropolitan area network, a mobile, a wired or wireless network, a private network, a public network, a virtual private network or any combination thereof.

In some embodiments, the APs are 802.11 WiFi access points that include one or more WiFi radios. Examples of WiFi radios include, but are not limited to, 802.11b/g/n radios transmitting in the 2.4 GHz band, having configurable channels from 1-14 with configurable transmit power levels from 0 to 1 Watts, depending on the country and the channel for which the radios are used. Another example of WiFi radios are 802.11a/n/ac radios in the 5 GHz band, which have configurable channels from 7 to 196 and configurable transmit power levels from 0 to 1 Watts, depending on the country and channel for which the radios are used. An AP uplinks (i.e., communicatively couples) via either Ethernet, WiFi networks, cellular networks, or other networks to the RRM system 100 that acts as a controller of the AP 110, its radios 120 and any clients 130 connected to the AP 110 or its radios 120. An AP 110 includes a number of different computing components (e.g., a processor and RAM) that are programmed to communicate using a communication network, which runs locally on the AP 110 and includes an internal data bus. In some embodiments, the communication protocol that the AP's components use includes a networking protocol such as transmission control protocol/internet protocol (TCP/IP), UDP, CAPWAP (RFC 5246), or COAP protocol. Software running on the computing components of the AP establishes the network connection to the controller of RRM system 100 and sends statistics of the AP 110 and its radios 120, information about neighbor APs and radios, and interference data to the controller. Upon receiving configuration data from the controller, the AP software configures the AP 110 and/or its radios.

Each radio 120 of AP 110 has configurable settings, including, for example, the channel, the width of the channel, and the transmit power of the channel the radio is operating on. In addition, each radio 120 scans the operating channel and monitors any clients 130 within range of the radio's coverage area. Information that the radio 110 obtains from clients 130 include, for example, service set identifiers (SSIDs), basic SSIDs, extended SSIDs, received signal strength indication (RSSI) and the like. The radios 120 also monitor discovery packets from beacons that are within range of the radio's coverage area.

In some embodiments, a radio that is configured with an SSID broadcasts beacons (if configured) or responds to probe requests. In some embodiments, the radios periodically scan all channels performing probe requests, and waiting (i.e., listening) for responses. When a radio receives (i.e., hears) a beacon message or probe response from another radio, the radio records the channel, channel width, RSSI, and BSSID for that message or response. By comparing the BSSID of the message to a table that maps the BSSID to a particular radio ID, the RRM system determines radios that are within range of the receiving radio. If no BSSID is found in the table, the RRM system considers the radio to be an unknown neighbor radio. Accordingly, a radio listens to other neighboring radios. Increasing the transmit power of a radio increases the probability of other radios falling within the range of that radio. Decreasing the transmit power decreases the probability of other radios falling within the radio's range.

The data generated by the radios 120 includes usage information of each channel including transmission time, interference time, idle time, transmission throughput, transmit power and the like. A radio 120 also generates usage information for each client 130 that is connected to the radio 120, which, for example, include client throughput, transmit retries, error rates, and signal strength of the client 130. For determining channel usability, the radios 120 determine spectral interference for each channel representing interference caused by devices other than access points 110 and their radios 120. For example, spectral interference is caused by microwave ovens, Bluetooth devices, wireless game controllers, and the like. In some embodiments, a radio 120 is classified as a being public or private with a public radio allowing any client 130 to access the radio, while a private radio restricts access to an authorized subset of clients.

In some embodiments, the clients 130 are mobile devices and larger computing devices. Examples of mobile devices include mobile phones, tablets, PCs, laptops and the like. Each client has associated traffic patterns and traffic quality of service (QoS). In some embodiments, the QoS, which the client 130 experiences, is associated with a service plan. If a client 130 is associated, for example, with a high level service plan, the RRM system 100 controls the corresponding AP 110 and radio 120 to allow the client 130 access to broader bandwidth and lower latency.

The RRM system 100 includes a number of different computing modules and radio components that are all communicatively coupled with each other or other components of the network, according to some embodiments. In some embodiments, the parts of the communication network run locally on a server of the RRM system and includes an internal data bus. In addition, the computing modules of the RRM system 100 and APs 110 are programmed to communicate with each other using a networking protocol, for example, a transmission control protocol/internet protocol (TCP/IP). Other examples of a networking protocol between the APs and RRM system 100 is UDP, CAPWAP (RFC 5246), or COAP protocol. In case that the RRM system 100 and APs 110 are accessible via a TCP/IP network, the RRM system 100 and APs 110 can communicate using various other types of management and control plane type protocols. In some embodiments, the APs 110 discover the RRM system 100 in form of a centralized controller on a local network by using broadcast and multicast discovery that is configured with server address of the RRM system 100 or by being directed to the RRM server through a DNS or DHCP mechanism.

Figure 2:
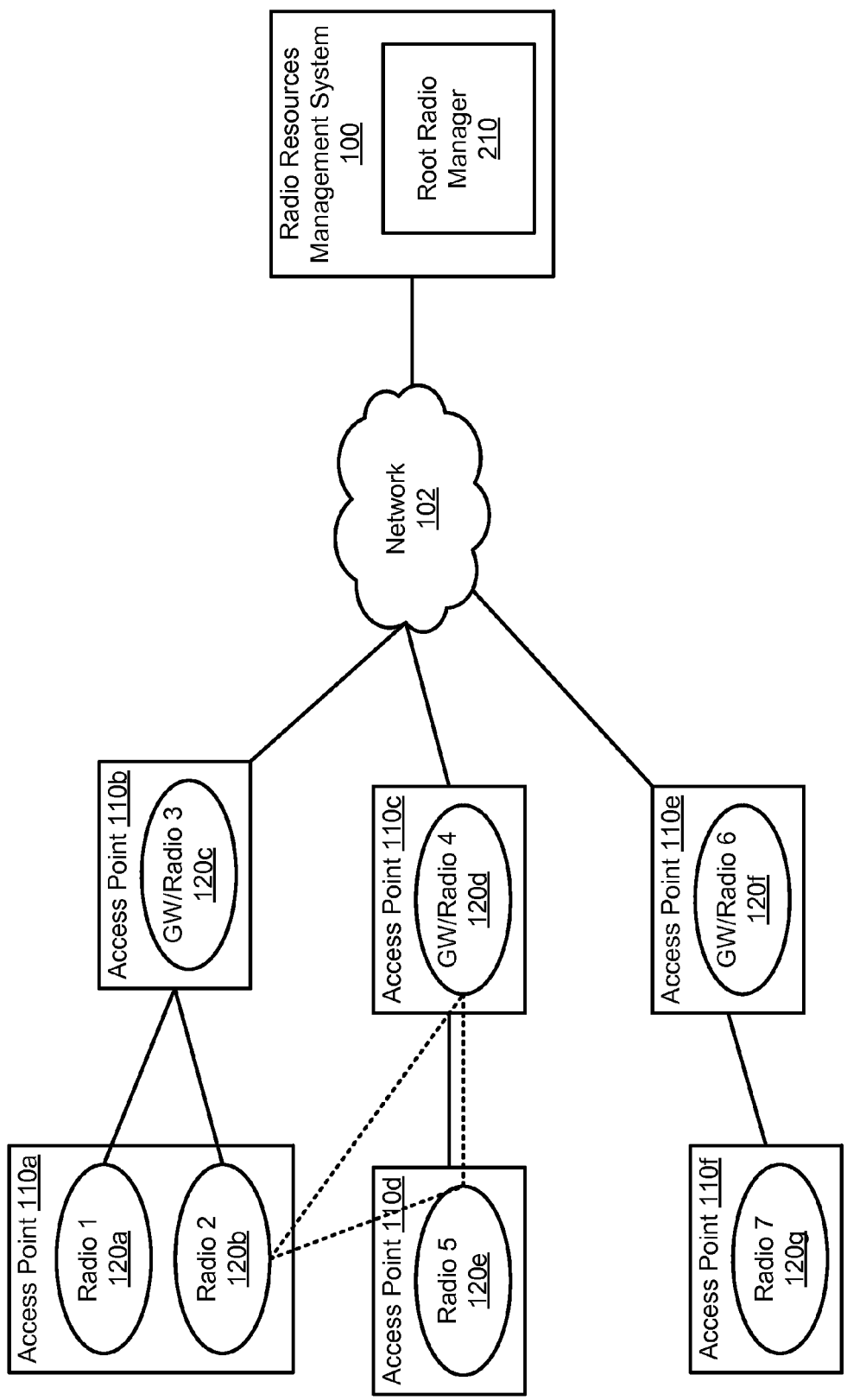
FIG. 2 illustrate a network of APs, including radios and gateways (GW), and a RRM system for managing the radio resources of APs, according to some embodiments.

In some embodiments, as illustrated in FIG. 2, the network of radio access points 110, radios 120 and radio resources management (RRM) system 100 forms a hierarchical structure. In the embodiment of FIG. 2, an AP (110a, 110d, and 110f) communicates through a gateway (GW) device (120c, 120d, 120f) in form of another AP (110b, 110c, and 110e) with the RRM system 100 via the network 102. The GW device 120 acts as the controller of any APs and radios that are linked downstream to the GW device 120. As such, the controller of the GW device 120 represents a parent node in the hierarchical representation, while the APs and radios that the controller manages are represented by child nodes. The RRM system 100 represents the root node of the hierarchy for all GW devices, APs and radios in the network. In some embodiments, the controllers of all APs included in the network are centralized in a single RRM system 100 that runs one or more controllers. In some embodiments, the controllers of individual APs and their radios run on separate GW devices that are themselves controlled by other GW devices or the RRM system 100. In some embodiments, a child device discovers a parent device on its upstream network interface using broadcast/multicast discovery that is configured network addresses of the parent nodes or by being directed to a parent controller through a DNS or DHCP mechanism. In some embodiments, the AP radios and APs connect to GW/radios using an IP based protocol. In some embodiments, AP radios and AP connect to the GW/radios using a TCP/IP, UDP, CAPWAP (RFC 5246), or COAP networking protocol. In some embodiments, the gateways/radios connect to the root radio manager 210 of the RRM system 100 using an IP based protocol, which also is added into the hierarchy.

In some embodiments, the GW devices optionally include one or more WiFi radios that include 802.11b/g/n radios in the 2.4 GHz band and 802.11a/n/ac radios in the 5 GHz band. As described above, the 802.11b/g/n radios have configurable channels from 1-14 and transmit power levels from 0 to 1 Watts, whereas the 802.11a/n/ac radios are configurable for channels from 7 to 196 and for transmit power levels from 0 to 1 Watts. In addition, the configuration channel and transmit power depends on the country and the channel for which the radios are used. A GW device uplinks (i.e., communicatively couples) via either Ethernet, WiFi networks, cellular networks, or other networks to the RRM system 100 or other separate GW devices that can act as controllers of the GW device and its corresponding APs, radios and any clients connected to the GW device, its APs, and radios. The GW device, similar to an AP, includes a number of different computing components (e.g., a processor and RAM) that are programmed to communicate using a communication network, which runs locally on the GW device and includes an internal data bus. In some embodiments, the communication protocol that the GW components use includes a networking protocol such as transmission control protocol/internet protocol (TCP/IP). Software running on the GW device establishes the network connection to the (parent) controller and sends statistics of the GW device and of its corresponding APs and radios, information about neighbor APs and radios, and interference data to the controller. Upon receiving configuration data from the controller, the gateway software configures the gateway, its APs and/or its radios. Represented as a hierarchical structure, the GW device is a parent node of the radios included in the gateway, the downstream-linked APs controlled by the GW device, the radios of the controlled APs. The GW radios, the controlled APs and radios of the controlled APs represent child nodes to the gateway parent node. Any client communicatively coupled to the GW device, its radios, the controlled APs, and the radios of the controlled APs represents a child node to the gateway parent node, too.

In a hierarchical network, the radios periodically gather WiFi interference data from other radios or WiFi devices in the network, as well as non-WiFi interference. In some embodiments, an AP radio 120 first scans for interference before being assigned with an operating channel by the AP 110. The AP 110 analyzes this scanned data, looking for WiFi neighbors, i.e. radios within range of the coverage area of the AP radio 120. For each WiFi neighbor, the AP 110 will send a request to its parent controller requesting whether the WiFi neighbor is part of its network. The parent controller looks at its managed WiFi devices for the WiFi neighbor, and if present in the list of known devices, informs the AP 110 that the device is handled by the parent controller. If the device is unknown to the parent controller, the parent controller requests its parent controller whether the WiFi device is known to the parent of the parent controller. This ascending of the hierarchy continues until there are no more parent nodes to be found with the last request sent to the root node. In this case, since none of the parent nodes, including the root node, know the WiFi neighbor, the RRM system 100 informs the AP 110 that the WiFi neighbor is unknown to the RRM system 100. If ascending the network hierarchy yields a parent node that knows the WiFi neighbor, the controller of this node sends the parent index back to the AP that send out the original request about a WiFi neighbor. In some embodiments, if an AP radio 120 has only unknown WiFi neighbors, meaning WiFi neighbors not controlled by any parent node of the hierarchical network, the AP radio manages its own channel, frequency and transmit power settings. In some embodiments, if one of the WiFi neighbors is handled by a parent controller, the parent controller manages the radio parameters of the AP radio 120 and its corresponding AP 110 by using a parent index passed to it. The parent checks this parent index against its own index, and if it matches, manages the AP radio 120 and its corresponding AP 110. In case this parent index does not match its own index, the parent controller passes the parent index to its own parent controller, which in turn passes the index to its parent controller, until a match to parent index is found. The parent controller with the matching parent index then manages the AP radio 120 and its corresponding AP 110.

Figure 3A:
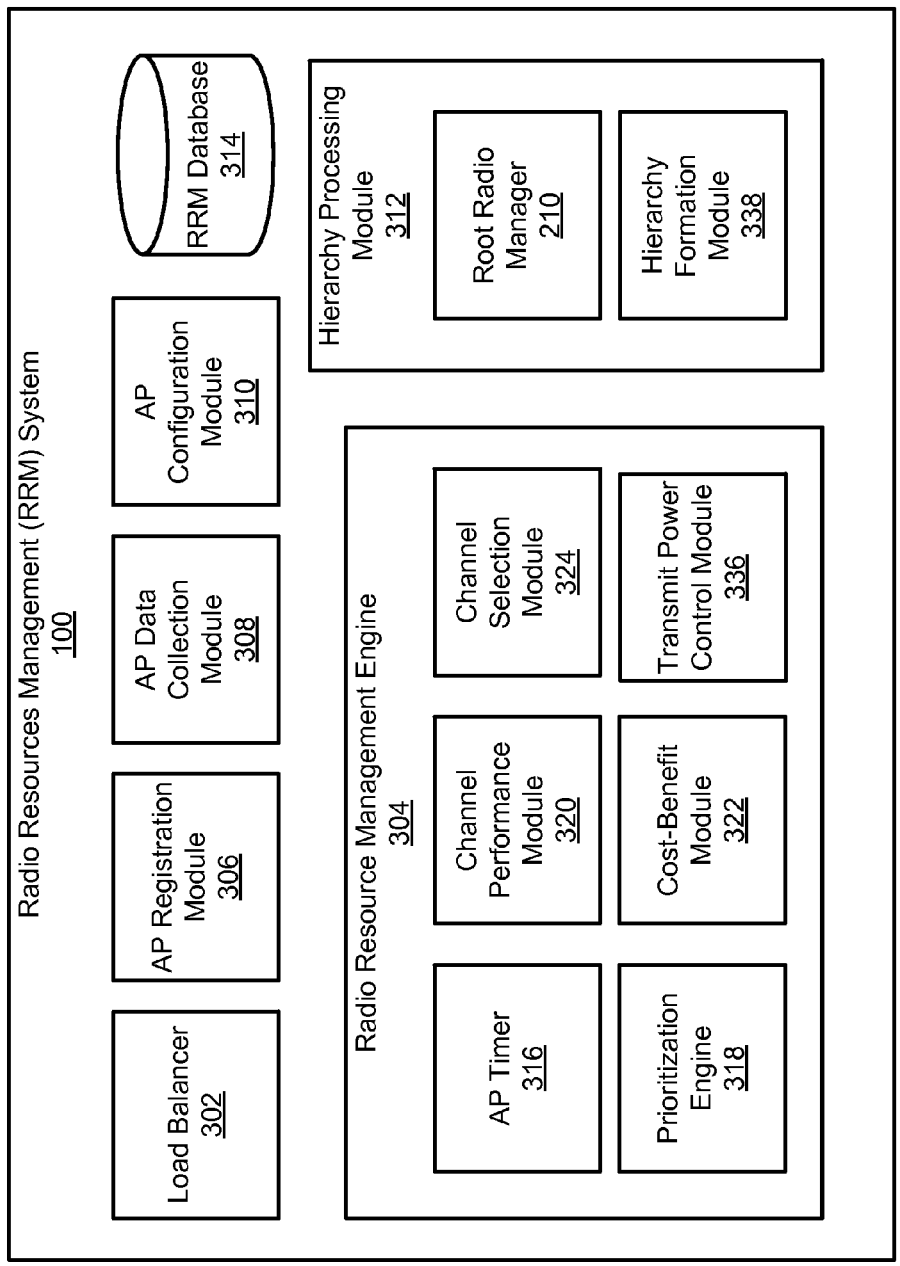
FIGS. 3A and 3B illustrate a RRM system for managing the radio resources of APs, according to some embodiments.

In some embodiments, as illustrated in FIG. 3A, the RRM system 100 includes a number of different computing systems including a load balance 302, a radio resource management (RRM) engine 304, an AP registration module 306, an AP data collection engine 308, an AP configuration module 310, a hierarchy processing module 312, and a RRM database 314. Through the AP configuration module 310 the RRM system 100 manages the radio resources, including the radio channels, frequencies, and transmit powers of each AP radio included in the network.

The different computing systems included in the RRM system 100 are all communicatively coupled through a communications network (e.g., the internet), and may be programmed to communicate with each other using a networking protocol such as transmission control protocol/ internet protocol (TCP/IP). In some embodiments, the communication network runs locally on a server of the RRM system 100 and includes an internal data bus. The different computing systems of the RRM system 100 include, for example, a processor, RAM and storage for running the RRM software. The RRM software establishes a network connection between the nodes in the network, including gateways, Aps 110, radios 120, other RRM servers or network servers, sending and receiving data between network nodes through the network connection. In some embodiments, other network servers, for example RADIUS or AAA servers 140, provide additional information about network nodes, e.g., client priorities based on client IDs. In some embodiments, the network server receives data about the network nodes from RRM database 314 of the RRM system 100, and provide access, priority and other information in return to the RRM engine 304.

Figure 3B:
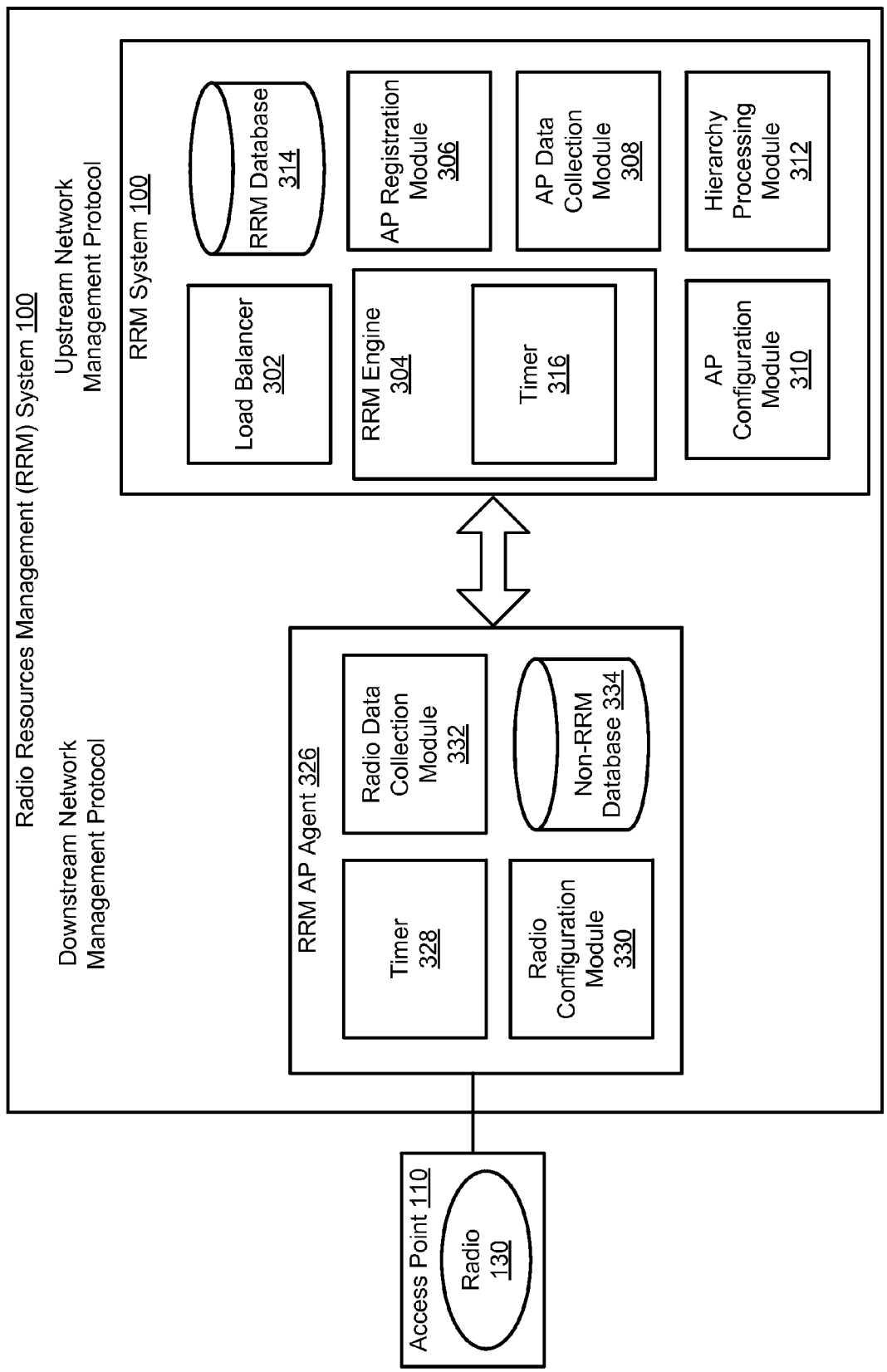

The hierarchy processing engine 312 includes a radio root manager 210 and controls all radio nodes (i.e. child nodes with respect to the root node) in the network. The hierarchy processing engine 312 through the AP configuration module 310 sends configurations of radio resource parameter to the gateways, APs 110, and radios 120 in the network as provided by, for example, the operator of RRM system 100 or the RRM engine 304. In some embodiments, as illustrated in FIG. 3B, the AP configuration module 310 sends the configuration data through a downstream network management protocol to an RRM AP agent 326 running on the AP. Upon receipt of the configuration data, the radio configuration module 330 configures the AP 110 and any radio 130 specified in the configuration data. The radio data collection module 332 of the RRM AP agent 326 returns statistics of the AP 110 and its radios 130, information about neighbor APs and neighbor radios, and interference data back to AP data collection module 308 through an upstream network management protocol.

The RRM database 314 stores statistics and data, including configuration information and interference, received through the AP data collection module 308 from various network components, including any gateways, Aps 110, radios 120 and clients 130. The RRM system 100 has access to the RRM database 314 for storing data from the APs 110, configuration for the APs 110, and data on priorities for SSIDs, clients 130, and other network data. The RRM database 314 additionally stores information generated by the RRM engine 304 for any network node and associates the data with the node. For example, data and information stored in the RRM database 314 includes radios 120, channels, interference, noise, traffic, neighbor access points, channel utilization and transmit power associated with each AP 110 and radio 120.

The AP data collection module 308 collects information from each access point 110 in the network, according to some embodiments. In some embodiments, the AP data collection module 308 implements a fetch (pull) mechanism. In these embodiments, the AP data collection module 308 communicates with an AP 110 to fetch (pull) the information from the AP 110 after a timer 316 associated with the AP 110 has expired, storing the information in the RRM database 314. Upon restarting and expiring of the timer 316, the AP data collection module 308 continues to periodically fetch (pull) information from the AP 110 associated with the timer. In some embodiments, the AP data collection module 308 uses a push mechanism to communicate with the RRM AP agent 326 managing the AP 110. In these embodiments, the AP data collection module 308 receives information from RRM AP agent 326 of the AP 110 by the RRM AP agent 326 sending the information upon timer 328 of the RRM AP agent 326 expiring.

The load balancer 302 distributes the load of managing all APs 110 in the network among multiple RRM engines 304 included in the RRM system 100, according to some embodiments. In some embodiments, each RRM engine 304 includes its separate timer 316. In these embodiments, the load balancer 302 dynamically assigns an AP 110 included in the network to an RRM engine 304. In some embodiments, this dynamic assignment of APs 110 is based on the capacity and current status of each RRM engine 304.

The RRM engine 304 monitors any AP 110 assigned by the load balancer 302 during the runtime of its AP timer 316. The RRM engine 304 configures the timer 316 to trigger a RRM algorithm when the timer 316 expires. The RRM algorithm is described in further detail with respect to FIGS. 6, 7, 9, and 10-13. The timer 316 is configured based on the channel configuration of the APs 110 monitored by the RRM engine 304. The APs 110 that have a valid channel configuration are set up with a default timer. In some embodiments, if an AP 110 is added to the network and does not have a valid channel configuration, upon registration of the added AP 110 with the AP registration module 306, RRM engine 304 configures the newly added AP 110 with an internal timer retrieved from the RRM database 314. In some embodiments, the wait time of the internal timer is less than the wait time of the default timer. After the timer 316 expires, the channel performance module 320 computes the channel performance of all channels for all radios of the AP 110 as part of the RRM algorithm. The cost-benefit module 322 as part of the RRM algorithm calculates the cost of changing the current channels for each radio 120 of the AP 110 based on the priority and performance impact of the radios, including neighbor radios. The RRM algorithm continues with the channel selection module 324 determining whether to change the channel of a particular radio 120 of the AP 110 based on the channel performance and cost calculation. Similarly, the transmit power control module 336 determines whether to increase or decrease the transmit power of each radio 120 of the AP 110 based on the radios' priority level.

Hierarchical Radio Network

Figure 4A:
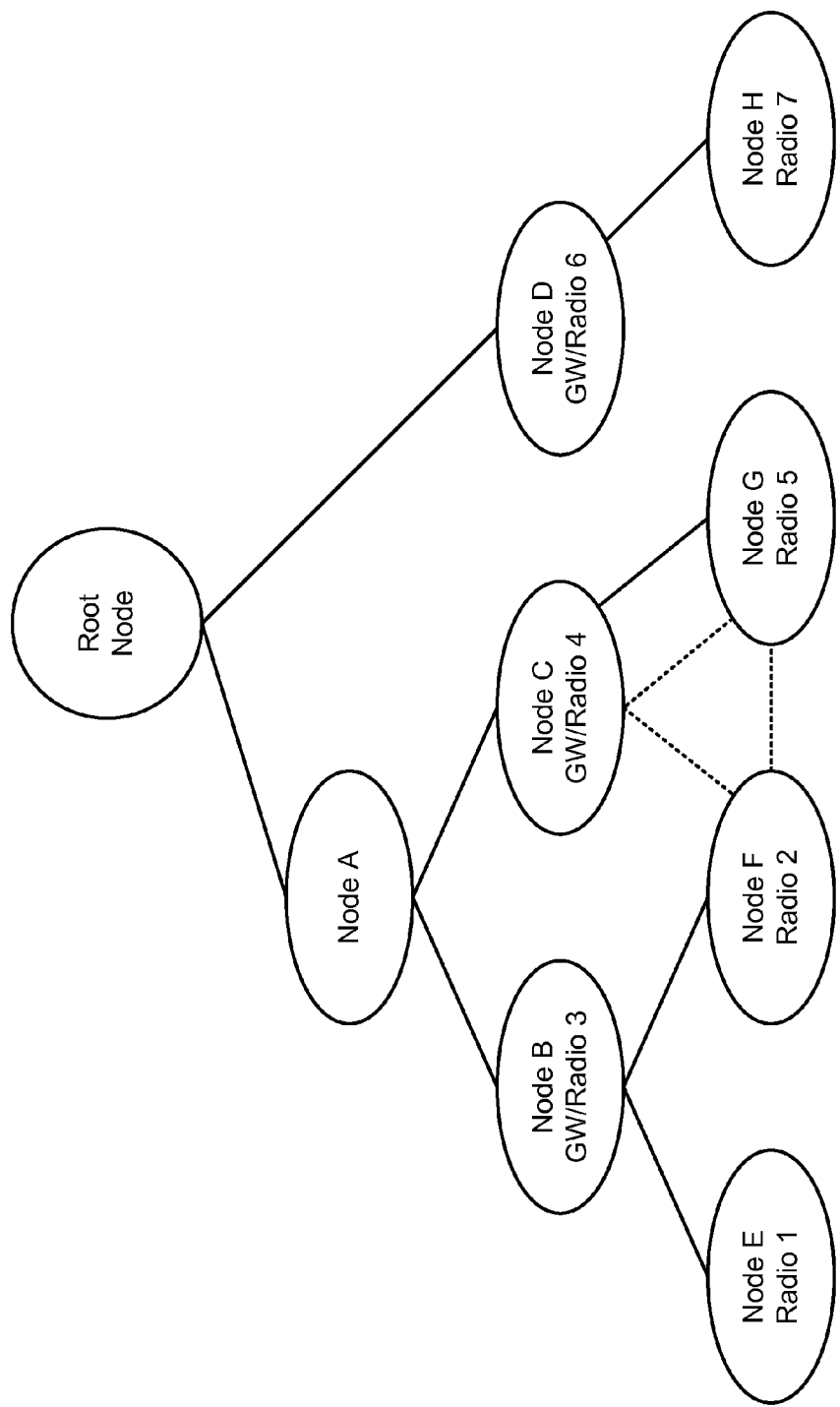
FIGS. 4A and 4B illustrate a hierarchical network for managing radio resources of APs and AP radios, according to some embodiments.
Figure 4B:
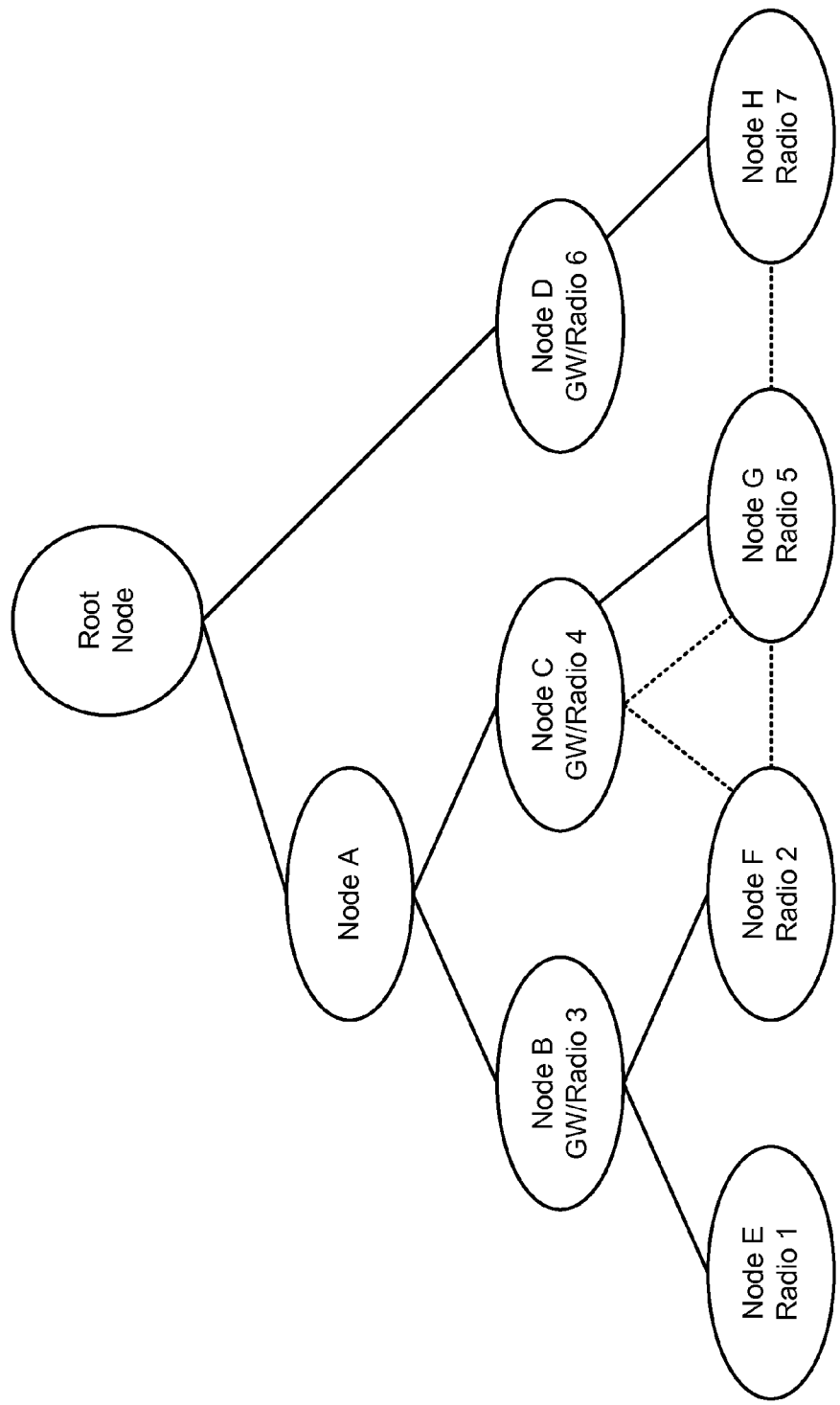

In some embodiments, as illustrated in FIGS. 4A and 4B, a hierarchical radio network employs independent nodes to manage the radio resources, e.g., radio channel, frequency and transmit power, of radio clients, APs 110, radios 120, gateways and other network components. The nodes represent devices or systems included the network, e.g., the APs 110, radios 120, the GW devices, and the root radio manager. Which parent node in the hierarchy manages a radio depends on the other network radios that are within range of the coverage area of that radio. With an increase in network radios falling within range of each other's coverage areas, the hierarchical network becomes increasingly more centralized. In the limit of all radios having overlapping coverage areas, the root node ends up managing all network nodes and their radio resources and is part of the hierarchical network.

In some embodiments, parent nodes with managing authority have zero or more child nodes. Each parent node is configured to manage its radio resources and the radio resources of its children by maintaining in a database including a list of all radios, which the parent node has the authority to manage. As shown in FIGS. 4A and 4B, the network hierarchy is represented by a tree structure with links between parent and child nodes. In addition, each node maintains a list of other radios with overlapping coverage areas. When adding a radio to the network, the radio sends WiFi packets on its serving channel to announce its presence. The radio also receives WiFi packets on its serving channel and non-serving channels to detect the presence of other radios. In some embodiment, as illustrated in FIGS. 4A and 4B, all leaf child nodes are radios, but non-leaf nodes optionally include radios in addition to being parent controllers that manage the radio resources of their child nodes. To operate the controller, non-leaf nodes include different computing systems that have processors, memory, and network connections.

A parent node that manages other child nodes is configured to retrieve data, statistics, and status from each radio of its child nodes. The parent node uses this data to run a RRM algorithm to manage its child radios and their radio resources. By selecting the channels, frequencies and adjusting the transmit powers of its child radios, the parent node minimizes interference between the radios, mitigates interference from unknown WiFi neighbors and non-Wifi sources, and limits interference to known WiFi neighbors. The radio configurations determined by the RRM algorithm are then communicated to the radios to be configured using an IP based control plane protocol. The parent nodes also connect to the root in form of the root radio manager using an IP based protocol.

Every node keeps track of its parent node and maintains a list of all its children. Every node also maintains a depth index with the top of the tree structure being index 1. All nodes connecting to the top have index 2. While traversing down one level in the tree structure, the previous level's index is incremented by one to derive at the next level's index until reaching a level that ends in a leaf node. In addition, every node maintains a list of all radios included in the node and all radios included in its child nodes. This list is used to determine the radio hierarchies formed within the network.

In addition to the hierarchical network of the RRM system 100, each radio forms a radio hierarchy including radios that are within range of the radio's coverage area. In some embodiments, the radios included in the network form islands of multiple radio hierarchies. If all radios are outside the range of other networks, the radio hierarchies include only a single radio. If all radios are within range of each other, a single radio hierarchy covers the entire network. In some embodiments, the radio hierarchy is automatically discovered by the radios periodically scanning their available radio channels and frequencies for radios that are within their coverage area.

The hierarchy formation module 338 generates the network hierarchy, which is stored in the RRM database 314, by discovering the child-parent relationship and the child-child relation between nodes included in the network. If the hierarchy formation module 338 receives updates to relationships among the nodes, e.g. a nodes has been added or deleted, it updates the stored network hierarchy, accordingly. In some embodiments, the child-parent relationship is configured on the two devices representing the child and parent based on their IP address/port configuration, which is communicated to the hierarchy processing engine using various discovery mechanisms, e.g., broadcast/multicast packets, DHCP/DNS pushed configuration, or configuration pushed from the parent device. In some embodiments, the child-child relationship is discovered by WiFi radio packets sent by one child and received by the other child and then communicated to the hierarchy formation module 338. Upon generating or updating the network hierarchy, the hierarchy formation module 338 overlays the radio hierarchy on top of the network hierarchy, which allows the RRM system 100 to optimally use processing resources to manage the radio parameters with the parent controllers managing the radio resources of their child nodes.

FIGS. 4A and 4B illustrate changes in which nodes of the hierarchical network manages radio resources for particular radios, APs, and gateways in a network. FIG. 4A illustrates an example tree structure of a hierarchical network with the solid lines describing a parent-child node relationship. The dotted lines indicate radios that are within the coverage area of each other. In the hierarchal network shown in FIG. 2, node E (Radio 1) and node H (Radio 7) are managing themselves, since these radios are not within range of any other radios included in the hierarchical network. Node C (GW/Radio 4), node F (Radio 2), and node G (Radio 5) are all managed by node A, which represents the common parent to all of these nodes, since parent node C is only configured to manage nodes C and G, but not node F. If radio 7 of node H then comes within range of radio 5 of node G, as illustrated in FIG. 2B by the new dashed line, node A stops managing nodes C, F, and G, and instead the root node manages nodes C, F, G, and H. The root node now is the common parent to nodes C, F, G, and H, while node E continues to manage itself, since no other radios are within its range. As radio devices in form of nodes are added and removed to the hierarchical network and radios in the network detect other radios within their range, the hierarchical tree structure self-modifies to reflect these changes.

In some embodiments of this hierarchical network, the radio management decisions are pushed as far down the structure tree as possible, while encompassing a complete graph of nodes. The radios of the child nodes managed by a common parent node detect each other on the basis of being within each other range of overlapping radio coverage area.

Some embodiments of the hierarchical network include use cases for a cable network. In these embodiments, the root node is the cable server(s) at the cable network's central location. This location is the main aggregation point for all wide area network groups of radio nodes that can detect each other's radios. The intermediate nodes include cable modem gateways employed by customer at their own premises. The cable modem gateways optionally have a WiFi radio with customers using zero or more additional WiFi radios at the premises. An example of a customer's home deployment includes one gateway/WiFi radio in addition to two additional WiFi radios with all of the radios being within range of each other. In the example, the radios do not detect radios from other customers in the network, since those customer's radios are outside their range. In this case, the WiFi radios use the cable modem gateway/WiFi radio as the parent node managing the radio resources of the two additional WiFi radios. In another example of an apartment building with multiple tenants, who each employs a cable modem WiFi gateway and zero or more WiFi radios, each cable modem WiFi gateway manages the WiFi radio and their clients on its local network of the one tenant, but not those WiFi radios and clients in local networks of the other tenants. The WiFi gateways then look upstream to the root node to determine if the WiFi neighbors are part of the overall cable network. If the WiFi neighbors are part of the cable network, the root node takes control and manages the radio resources for the tenants' WiFi gateways and radios. The leaf nodes are the one or more separate WiFi radios in the case of the cable modem gateway having a WiFi radio managing these separate WiFi radios. In case of no separate WiFi radio, the cable modem gateway with WiFi radio represents the leaf node.

Prioritization Scheme

The RRM system 100 and other parent RRM controllers manage the radio resources of the radios of an AP based on the priority levels of the radios, according to some embodiments. In some embodiments, data used to determine the priority level of a radio includes data related to clients connect to the radio, the properties of the radio, and the properties of the sub-network on which the radio is. In some embodiments, the client-related data for determining radio priority includes: client traffic patterns and traffic quality of service (QoS); client types (iPad, PC, mobile phone, etc.); clients with premium service (pay for a higher service level, or in a group with higher service level, a longer term customer, etc.); client is owner of the radio instead of a public user of the radio; client priority defined by the service provider; client location (e.g., clients inside a building increase a radio's priority versus clients outside the building); client capabilities (such as 802.11ac capable, 802.11k capable, etc.); and any combination thereof. In some embodiments, the radio properties on which the priority level is based includes: traffic patterns on the radio and traffic QoS; location of the radio (e.g., a radio located inside an business has a higher priority than a radio serving traffic near a stop light); radio owner ordering premium service from the service provider; the capabilities of the radio (e.g., 802.11ac capable); and any combination thereof. In some embodiments, properties of the sub-networks determining radio priority include different having different priorities with radio traffic split into several sub-networks (WLANs and SSIDs for 802.11). In some embodiments, a private user-owned SSID and WLAN has a higher priority than a public SSID and WLAN served by the same radio. In some embodiments, clients and traffic patterns on different sub-networks are accounted for in the priorities of the radios.

Periodically (configured by timers 316), the RRM engine 304, which is part of the RRM system 100 or other independent parent RRM controller, runs the prioritization engine 318 to determine the priorities of the radios managed by the RRM engine 304. In some embodiments, the prioritization engine 318 uses a client list for each radio 120 to determine the priority of each radio 120. In some embodiments, the prioritization engine 318 retrieves the client list and each client's priority based on the client IDs in the list from the RRM database 314. In some embodiments, the priority of each radio is calculated as the sum of the priorities of clients connected to the radio. In some embodiments, the prioritization engine 318 stores the calculated priorities of the radios in the RRM database 314. For example, Table 1 lists assignments of client priorities to clients in the radio network shown in the FIG. 1.

TABLE 1

Client Priority Assignment

| Client ID | Client Priority |
|---|---|
| Client 1 | 3 |
| Client 2 | 6 |
| Client 3 | 7 |
| Client 4 | 1 |
| Client 5 | 1 |
| Client 6 | 2 |

In some embodiments, the prioritization engine 318 uses data received from the AP 110 that shows which clients 130 are connected to the AP 110 and looks up the priorities of the clients in a RADIUS server or AAA server 140. The prioritization engine 318 uses the client priorities and maps these to the radios 120 being processed by the prioritization algorithm. Each radio priority is calculated as the sum of client priorities, which creates a priority order for the radios. Table 2 lists the calculated priority of each radio in the network shown in FIG. 1. Each radio priority is calculated as the sum of client priorities.

TABLE 2

Calculated Radio Priority

| Radio ID | Radio Priority (Sum of clients) |
|---|---|
| Radio 1 | 9 |
| Radio 2 | 7 |
| Radio 3 | 0 |
| Radio 4 | 0 |
| Radio 5 | 4 |

Another example includes calculating the radio priority based on SSID priorities of the clients 130 connected to the radio 120. This priority calculation is used if the clients 130 are not assigned any particular client priorities. The prioritization engine 318 retrieves the client list from the RRM database 314 and determines client priority based on its SSID. The SSIDs are configured in the RRM database 314 (by an operator for instance) with priorities. By connecting to an SSID, the client will obtain a priority which is defaulted for that SSID. Table 3 shows SSID priorities and clients 130 having the corresponding SSID. In some embodiments, prioritization engine 318 retrieves the SSID priorities based on the client ID and corresponding SSID associated with the client ID from the RRM database 314.

TABLE 3

SSID Priorities

| SSID | SSID Priority | Clients on SSID |
|---|---|---|
| Public WiFi | 1 | Clients 4, 5, 6 |
| Home WiFi | 2 | None |
| Service WiFi | 3 | Clients 1, 2, 3 |

In the example illustrated in FIG. 1, clients 130 can connect to one of several SSIDs provided by each radio 120. In this example, the home user SSID has a higher priority than the public SSID if served by the same radio. Table 4 lists the radios in decreasing order of calculated priority based on SSID priority. Each radio priority is calculated as the sum of SSID priorities of the clients 130 connected to the radio 120.

TABLE 4

Radios Sorted by Determined Priority

| Radio ID | Radio Priority (Sum of clients) |
|---|---|
| Radio 1 | 6 |
| Radio 2, 5 | 3 |
| Radios 3, 4 | 0 |

Channel and Frequency Control Mechanism

Figure 5B:
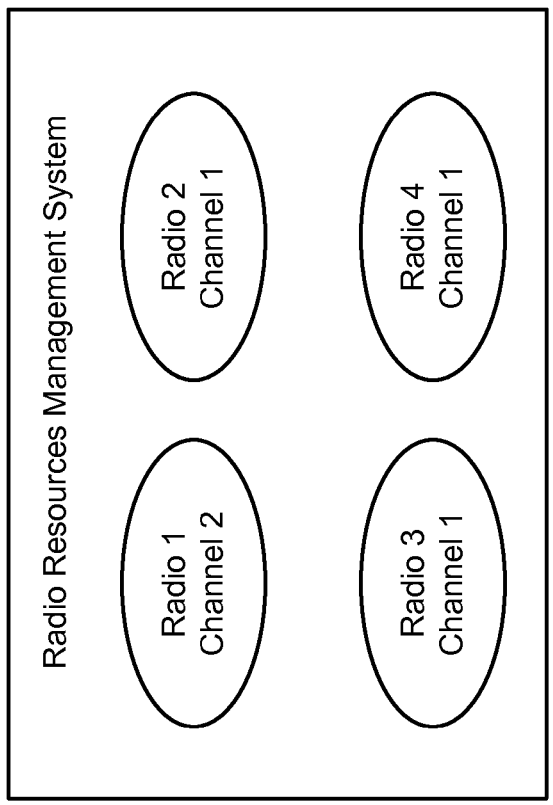
FIGS. 5A and 5B illustrate a RRM system including a plurality of radios operating on various frequency channels, according to some embodiments.
Figure 5A:
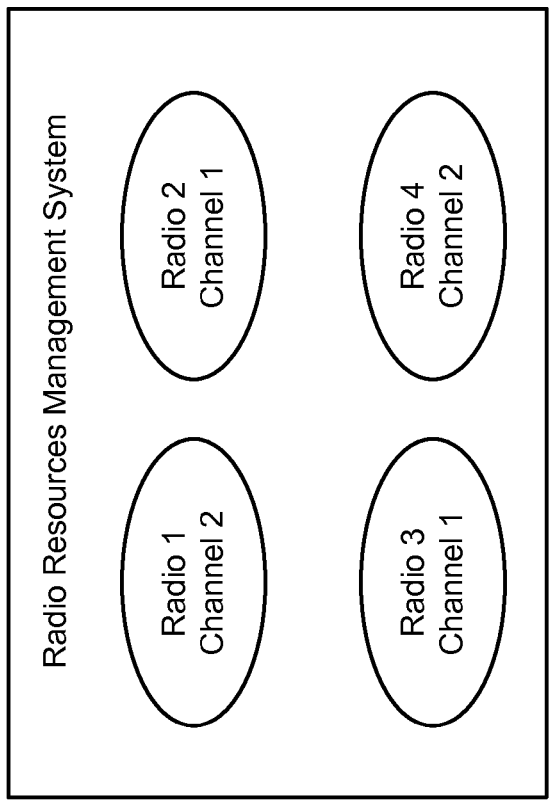

FIGS. 5A and 5B illustrate embodiments of a RRM system 100 that employs a prioritization scheme to manage AP radios of a wireless network by selecting radio channel and frequency assignment for these radios. In some embodiments, the RRM system 100 biases the channel selection such that radios obtain a more favorable channel selection than other radios based on the priorities associated with the radios. The example of a RRM system 100, as illustrated in FIG. 5A, has four radios (Radio 1, 2, 3, and 4) operating on two channels (Channel 1 and 2). In the shown example, Radio 1 has a higher priority than Radios 2, 3, and 4. By favorable biasing Radio 1 over the other radios because of its higher priority, the channels are reallocated such that Radio 1 operates on Channel 2 exclusively with Radios 2, 3, 4, using Channel 1, as illustrated in FIG. 5B. With this channel selection, resulting from the bias towards Radio 1, Radio 1 experiences no co-channel interference from the other radios, whereas Radios 2, 3, and 4 are continue to interfere with each other.

Figure 6:
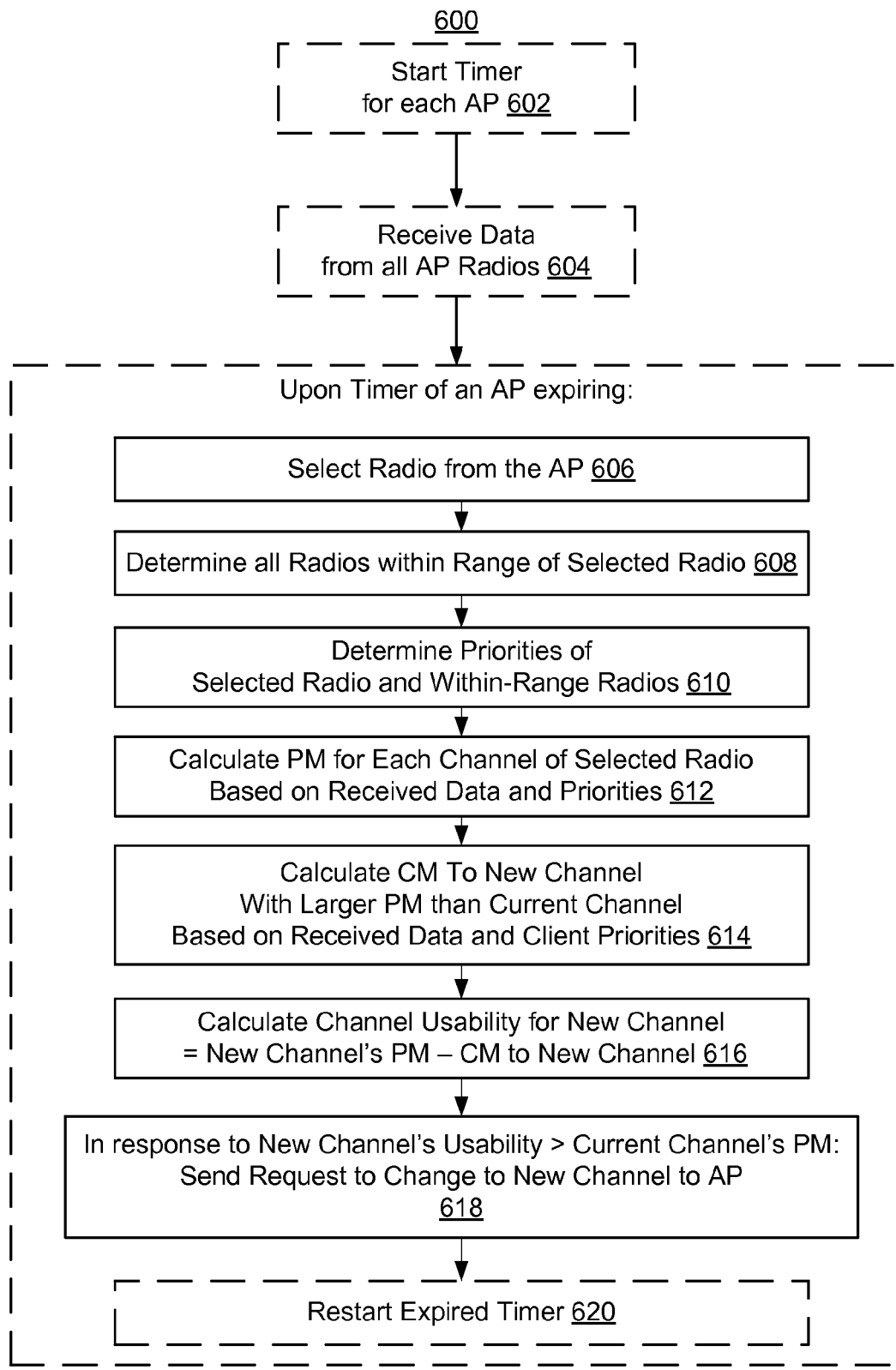
FIG. 6 illustrates a flowchart of a method for managing radio channels in a wireless network of radio access points, according to some embodiments.

FIG. 6 illustrate a flowchart of a method 600 for managing radio channels in a wireless network of radio access points that include one or more radios by a RRM system, according to some embodiments. In some embodiments, the method includes starting 602 a timer 316 for each radio access points included in the wireless network. In some embodiments, while the time is running, the RRM system receives 604 data from the one or more radios of each radio access points. The data includes the operational properties of the one or more radios and of clients connected to the one or more radios. The RRM engine 304 selects 606 a radio from the one or more radios of the one radio access point. In some embodiments, the selected radio is from the access point, for which the timer 316 expired. The selected radio operates on a current channel. The RRM engine 304 then determines 608 all within-range radios of the radio access points, which have a coverage area that overlaps with a coverage area of the selected radio.

The method further includes that the RRM engine 304 determines 610 the priority for the selected radio and all within-range radio based on the data that the RRM system received before the timer 316 expired. The channel performance module 320 then calculates 612 a performance measure (PM) for each channel of the selected radio. The performance measure (PM) in part depends on the received data and the priorities of the selected radio and the within-range radios. The RRM engine 304 also determines the priority of clients that are connected to the current channel. Upon determining the priority of the clients, the cost-benefit module 322 calculates 614 a cost measure (CM) indicating a cost of changing the current channel to a new channel that has a larger calculated performance measure than the current channel's performance measure. The cost of changing the current channel depends in part on the received data and the priorities of the connected clients.

Upon calculating 612, 614 the performance measures (PM) and cost measures (CM), the method includes that the channel selection module 324 calculates 616 a measure of channel usability for the new channel, which is the difference between the new channel's performance measure (PM) and the cost measure (CM) of changing the current channel to the new channel. In response to the new channel's measure of channel usability exceeding the current channel's performance measure (PM), the RRM system sends 618 a request for changing the current channel to the new channel to the one radio access point with the expired timer 316. In some embodiments, the RRM system also restarts 620 the expired timer.

The method 600 is performed at a computing device as described in detail below, such as the example machine shown in FIG. 14, as may be controlled by specially programmed code (computer programming instructions) contained in the RRM system 100 or any of its components, wherein, in some embodiments, such specially programmed code is not natively present in the RRM system 100 or any of its components. Some embodiments of the method 600 may include fewer, additional, or different steps than those shown in FIG. 6, and the steps may be performed in different orders.

In some embodiments, the method for managing radio channels in a wireless network of radio access points comprises any of the following steps:
1. Collect data from all radios being managed by the centralized system.
2. Determine the network graph by looking at monitored data to see which radios are in range of other radios.
3. Create an ordered list of channels and frequencies for each radio sorted by the interference they are seeing.
4. Calculate the priority for every radio. In some embodiment, the priority is calculated from a selection of priority influencing properties of the system as described herein.
5. Order the radios by priority and start processing each radio from high priority to low priority:
   a. Calculate the interference levels on each channel and frequency, which represent negative performance measures. In some embodiments, the interference levels include:
      i. interference from unknown sources,
      ii. interference from unknown radios of the same protocol, and/or
      iii. interference from known radios of higher priority than the processed radio. In some embodiments, for each radio of higher priority the inference level is multiply by the priority by the higher priority radio, which allows the highest priority radios to factor most heavily into the interference calculation.
   b. Calculate the cost of changing the channel and frequency. In some embodiments, the cost of changing the channel and frequency includes:
      i. Number of connected clients that cannot be instructed to change channels with the radio, which, in some embodiments, is based on the client priorities to avoid switching channels when high priority clients are connected to the processed radio.
      ii. Number of connected clients using real-time traffic such as VOIP or video protocols, which, in some embodiments, include client priorities to avoid switching channels, when high priority clients sending real-time traffic are connected to the processed radio.
    iii. Impact of channel change on neighbor radios, which, for example, includes changing to a channel that interfere with a neighbor, thereby adding to the cost of changing the channel and frequency.
  c. Calculate the benefit of changing for each channel that takes into account the calculated interference levels (i.e., negative performance measures) and the calculated cost of changing the current channel of the processed radio.
  d. Compare the benefit of changing against maintaining the current channel and if better by a user-defined percentage threshold, instruct the processed radio to change channels.

In some embodiments, the RRM engine 304 employing the method determines the best channels for each radio by looking at the interference that each radio sees on each channel with the best channels being the ones with the least interference. The RRM engine 304 then determines the priority for each radio by using a client list for each radio and retrieving their priority from the RRM database 314 as described above under Prioritization Scheme.

In some embodiments, the method 600 loops through all radios in priority order from highest to lowest priority to select the best channel for each radio. As a channel is selected for a radio, this may cause surrounding APs to have different interference patterns—for example, if two APs are near each other, and AP 1 was using channel 1—and providing 10% interference to AP2—the interference is only on channel 1. However, if AP 1 is going to switch to channel 6, then when AP 2 is processed, it could consider that the interference is now on channel 6 instead. In some embodiments, the method adds weights to the interference by higher priority APs so that these APs are more likely to gain channel isolation. When all radios have been processed, the RRM system 100 employing the method configures the new channels to each radio.

The RRM system 100 provides real time RF management of wireless networks, according to some embodiments. In some embodiments, the RRM system 100 includes one or more RRM engines 304 that continuously monitor a set of APs in the wireless network assigned to the RRM engines 304 according to the load balancer 302. The load balancer 302 manages all the APs 110 in the wireless network and dynamically assigns APs 110 to multiple RRM engines 304 based on each RRM engine's capacity. Once all APs 110 are assigned by the load balancer 302, the RRM engine 304 is responsible for setting up the RRM algorithm to process the APS 110.

The RRM engine 304 configures its timers to trigger the RRM algorithm for each of its APs 110, according to some embodiments. Timers 316 are configured depending on the channel configuration of the APs 110. APs 110 with a valid channel configuration (all radios already have a channel configured for handling traffic) are set up with a default RRM timer. Unlike APs 110 already included in the network, newly added APs may not have a channel configured for handling traffic. In these cases, the RRM engine 304 configures the APs 110 with an internal timer from the RRM database 314, whose wait time is less than the default RRM timer so that the APs with no configured channels are processed by the RRM algorithm before the already configured APs 110. When an AP timer 316 expires, the RRM algorithm is triggered, which retrieves various real-time RF characteristics of the AP 110 from RRM database 314 and uses these characteristics to perform its functions.

Figure 7:
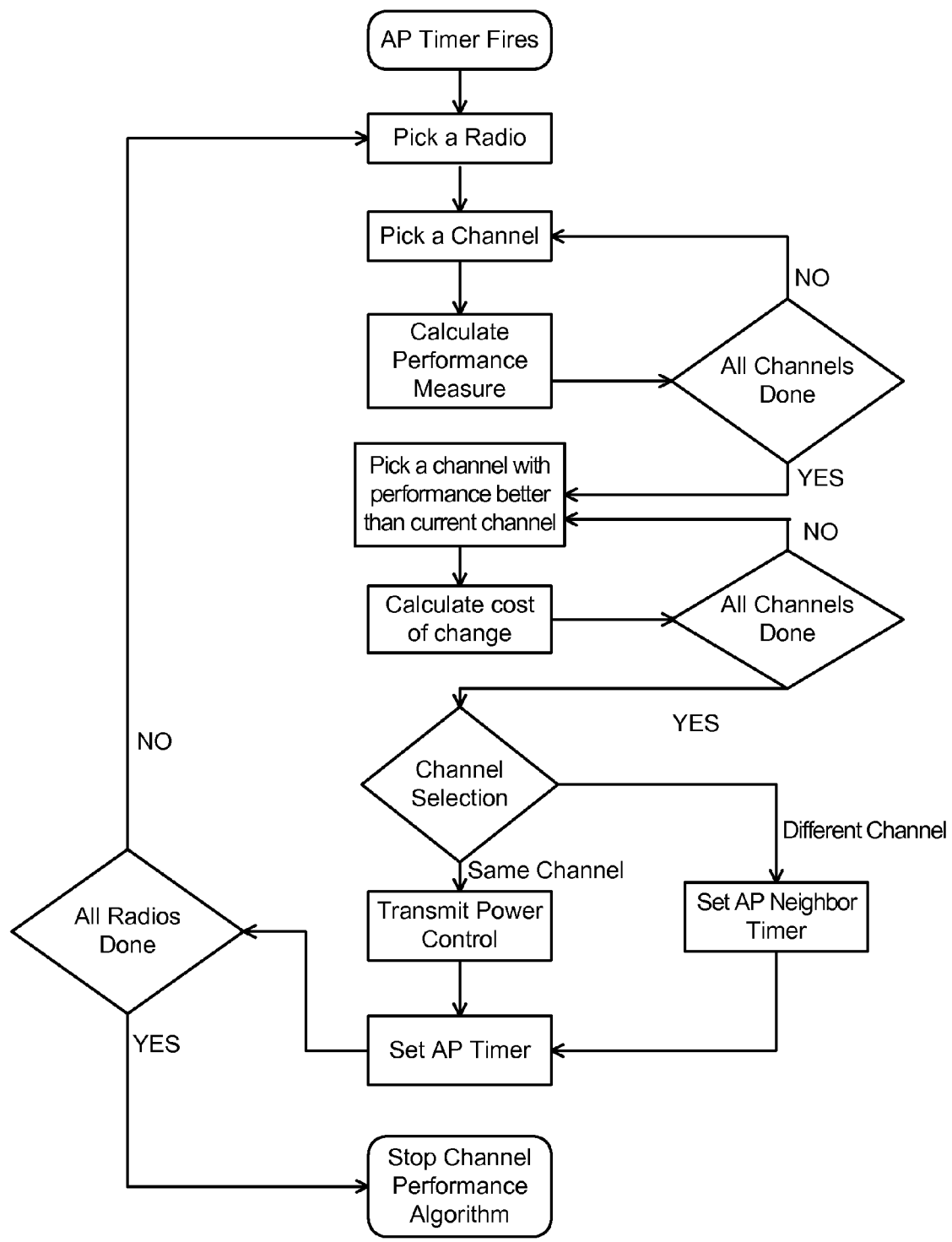
FIG. 7 illustrates a flowchart of a method for managing radio channels in a wireless network of radio access points, according to some embodiments.

The RRM database 314 is designed to store all AP related information such as radios and the radio properties, e.g., channels, interference, transmission, traffic, neighbor APs, channel utilization, transmit power and the like. Since the RRM system 100 continuously receives changing information sent by APs 110 in real time, the AP data collection module 308 updates the RRM database 314, when the APs 110 report their data to the system and when an AP 110 joins or leaves the network. In some embodiments, the RRM engine 304 retrieves the data for performing the RRM algorithm, as illustrated in FIG. 7, from the RRM database 314 after the AP timer 316 expires. Upon the AP timer 316 expiring, the channel performance module 320 of the RRM engine 304 determines for each radio 120 of an AP 110 the channel performance for all configured channels based on radio parameters affecting the channel performance. For all radios 120, the cost-benefit module 322 of RRM engine 304 further determines, for all channels with a better channel performance than a radio's current channel, the cost of changing from the current channel to the better performing channel. Upon determining the channel performance and change cost, the channel selection module 324 of the RRM engine 304 selects a channel that has the best positive channel usability, defined as the difference between channel performance and cost, among all better performing channels. If the selected channel with the best positive channel usability is not the current channel of the radio, the RRM engine 304 sends a request to the AP 110 to change the radio's channel to the selected channel, stores the newly selected channel in the RRM database 314, and associates the stored channel with the AP 110 and the radio 120 in the RRM database 314. The RRM engine 304 further sets the AP timer 316 to the default RRM timer and restarts the AP timer 316. The RRM engine 304 also adjusts the AP timer 316 of any neighbor APs 110 of the AP 110 so that the execution of the RRM algorithm for the neighbor APs 110 is delayed, allowing collection of interference data for the neighbor APs due to the AP changing the channel of its radio. If the selected channel with the best positive channel usability is the same as the current channel of the radio 120, the RRM engine 304 sets the AP timer 316 to the default RRM timer and restarts the AP timer 316. In some embodiments, prior to restarting the AP time 316 the transmit power control module 336 of the RRM engine 304 determines whether to change the transmit power of any radios of the AP 110. In some embodiments, the transmit power control module 336 determines whether to adjust the AP radios' transmit powers independent of the RRM engine 304 determining whether to change channels of the radios. If the transmit power control module 336 determines a change in transmit power of one or more radios 120, the RRM engine 304 request the AP 110 to adjust the transmit power of the one or more radios 120, accordingly. The adjusted transmit power is also stored in the RRM database 314 and associated with the corresponding AP 110 and radio 120 in the RRM database 314. In some embodiments, if the transmit control power module determines that a radio 120 of an AP 110 does not experience any interferences from other network radios (i.e., the radio is outside the range of the other network radio), the transmit power control module sets this radio's transmit power to the maximally allowed transmit power. In some embodiments, if the transmit power control module 336 determines that a AP radio is outside the range of other network radios, the transmit control power module increases this radio's transmit power by 25% of its current transmit power.

Transmit Power Control Mechanism

FIGS. 8A and 8B illustrate embodiments of a RRM system that employs a prioritization scheme to manage AP radios of a wireless network by configuring the transmit powers for these radios. In some embodiments, the RRM system biases the channel selection such that radios obtain a more favorable transmit power than other radios based on the priorities associated with the radios. The example RRM system, as illustrated in FIG. 8A, has two radios (Radio 1 and 2) operating on the same channel (Channel X) and having transmit powers that result in the same coverage area. In the shown example, Radio 1 has a higher priority than Radios 2. By favorable biasing Radio 1 over Radio 2 because of Radio 1's higher priority, the transmit power can be adjusted such that Radio 1 has a wider coverage and Radio 2 has a lesser coverage, as illustrated in FIG. 8B. In this example, the interference between the two radios is mitigated by reducing Radio 2's transmit power to decrease the interference while increasing the transmit power of Radio 1, resulting in unequal transmit powers of the two radios based on their priorities. By changing the transmit powers of the two radios, Radio 1 now has a much larger coverage area than Radio 2.

Figure 9:
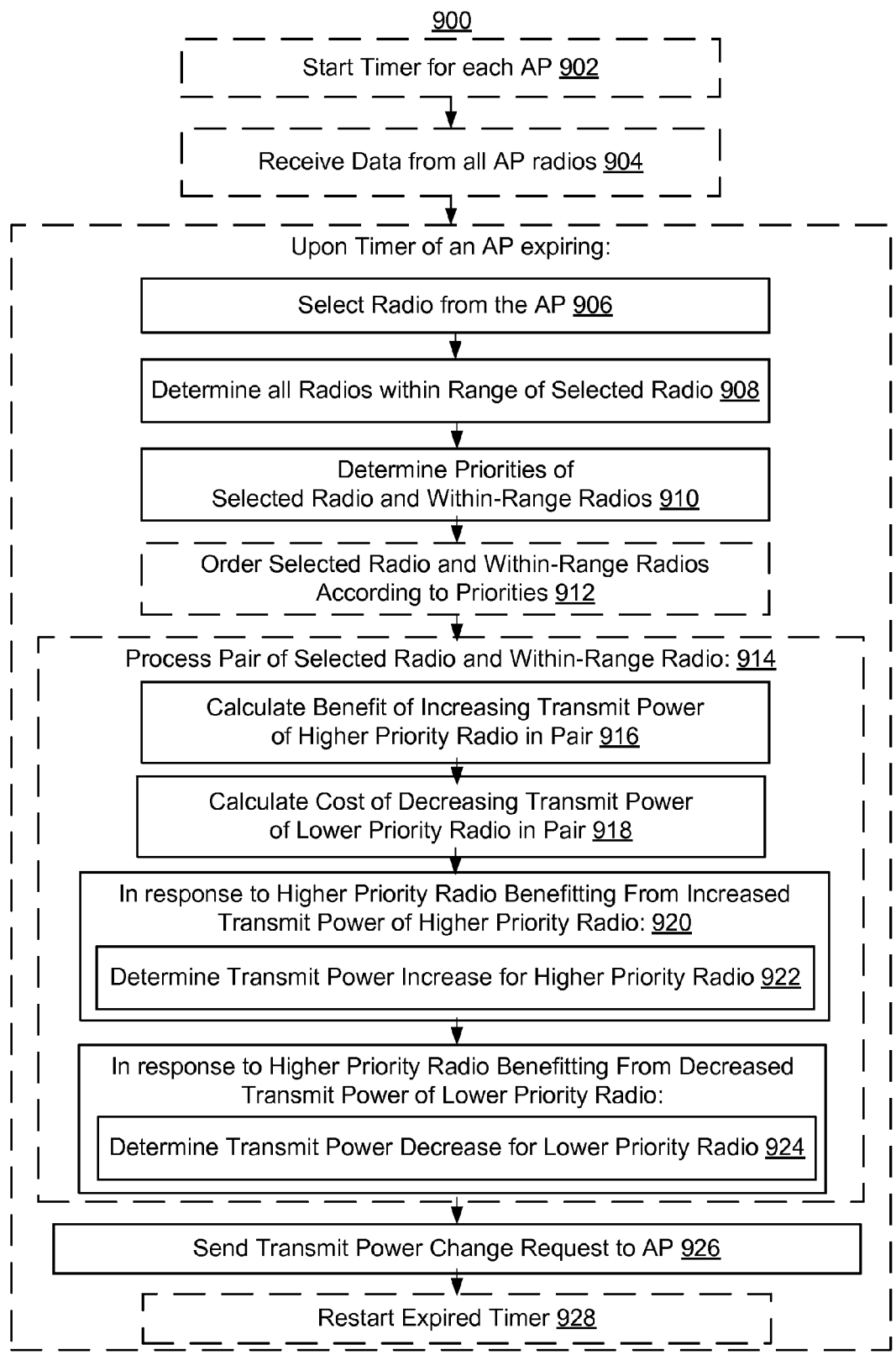
FIG. 9 illustrates a flowchart of a method for managing radio transmit powers in a wireless network of radio access points, according to some embodiments

FIG. 9 illustrate a flowchart of a method 900 for managing radio channels in a wireless network of radio access points that include one or more radios by a RRM system 100, according to some embodiments. In some embodiments, the method includes starting 902 a timer for each radio access point (AP) included in the wireless network. In some embodiments, while the timer is running, the RRM system 100 receives 904 data from the one or more radios 120 of each AP 110. The data includes the operational properties of the one or more radios and of clients connected to the one or more radios. The RRM engine 304 selects 906 a radio from the one or more radios 120 of the one AP, which, in some embodiments, is the AP for which the timer expired. The selected radio operates on a current channel. The RRM engine 304 then determines 908 all within-range radios of the selected radio, which have a coverage area that overlaps with a coverage area of the selected radio.

The method further includes that the RRM engine 304 determines 910 the priority for the selected radio and all within-range radios based on the data that the RRM system 100 received before the timer expired. In some embodiments, the selected radio and all within-range radios are ordered 912 according to priority from highest to lowest priority. A pair of the selected radio and one of the within-range radios is processed 914. In some embodiments, all ordered pairs are processed. The channel performance module 320 then calculates 916 the benefit of increasing the transmit power of the higher priority radio in the pair. The channel performance module 320 then calculates 918 the cost of decreasing the transmit power of the lower priority radio in the pair. In response to the higher priority radio benefiting 920 from an increased transmit power of the higher priority radio, the cost-benefit module 322 determines 922 the transmit power increase for the higher priority radio. In response to the higher priority radio benefiting 924 from a decreased transmit power of the lower priority radio, the cost-benefit module 322 determines 926 the transmit power decrease for the lower priority radio. The RRM engine 304 transmits 928 the power change request to the AP 110 with the expired timer 316. The RRM engine 304 then resets 930 the expired RRM timer 316.

The method 900 is performed at a computing device as described in detail below, such as the example machine shown in FIG. 14, as may be controlled by specially programmed code (computer programming instructions) contained in the RRM system 100 or any of its components, wherein, in some embodiments, such specially programmed code is not natively present in the RRM system or any of its components. Some embodiments of the method 900 may include fewer, additional, or different steps than those shown in FIG. 9, and the steps may be performed in different orders.

In some embodiments, the method for managing radio transmit powers in a wireless network of radio access points comprises any of the following steps:

1. Collect data from all radios being managed by the centralized system
2. Determine the network graph by looking at monitored data to see which radios are in range of other radios
3. Use channel allocation mechanisms to assign channels.
4. Determine the set of radios which do not interfere with other radios—increase their transmit power to the maximum level.
5. Determine the set of radios operating on the same channel/frequency and with overlapping coverage areas.
    a. Calculate the priority for every radio. The priority is calculated from a selection of priority influencing properties of the system (see lists below)
    b. Order the radios that are neighbors and use the same channel by priority and start processing each radio from high priority to low priority—for each radio consider all neighbors on the same channel
    c. Calculate the amount of overlapping signal at maximum power for each radio
    d. Calculate the amount of benefit of increasing transmit power of the higher priority radio
        i. This includes handling higher priority clients which are at the edges (or just out of) signal range
        ii. The increase in bandwidth to clients with low signal level (both high and low priority)
    e. Calculate the amount of cost of decreasing the transmit power of the lower priority radio
        i. This includes client connections that would be terminated by lowering transmit power
        ii. Including cost of coverage reduction to other areas of the network
    f. If a higher priority radio can benefit from an increased transmit power level—then increase the transmit power level.
    g. If a lower priority radio can benefit a higher priority radio by decreasing transmit power level, then decrease transmit power level.

In some embodiments, the method for decreasing radio transmit powers in a wireless network of radio access points comprises any of the following steps:

1. Select a radio A to process for the timer of its APs is expired.
2. Determine the priority of radio A.
3. For each other radio B using the same channel or overlapping channel, which is able to hear radio A:
    a. Determine the priority of radio B.
    b. If radio B priority is greater than or equal to radio A's priority:
        i. If radio A's transmit power is equal or larger than a user-specified percentage, for example 20%, of the maximum allowed transmit power on the channel in the given regulatory domain, decrease radio A's transmit power by 10% (configurable) of the maximum allowed transmit power on the channel in the given regulatory domain.
        ii. Reset the timer to process radio A in the future.
        iii. Stop processing radio A.
    c. If radio B priority is lower than radio A's priority:
        i. Continue looping to the next radio B.
4. Reset the timer to process radio A in the future.

In some embodiments, the method for removing client coverage holes by increasing radio transmit powers in a wireless network of radio access points comprises any of the following steps:

1. Select a radio A to process for the timer of its APs is expired.
2. Determine the priority of radio A.
3. For each client connected to radio A with an RSSI below a user-specified RSSI threshold (also referred to as a coverage hole area):
   a. If any other radio can hear the client with an RSSI above the configurable RSSI threshold, continue to the next client
   b. If no other radio can hear the client with an RSSI above the configurable RSSI threshold, increment the client coverage hole count.
4. If client coverage hole count is greater than a user-specified client coverage hole count threshold:
   a. For each other radio B using the same channel or overlapping channel, which is able to hear radio A:
      i. Determine the priority of radio B.
      ii. If radio B priority is greater than or equal to radio A's priority, reset the timer to process radio A in the future, and stop processing radio A.
   b. If step a passed without hitting the condition of radio B priority being greater than or equal to radio A's priority:
      i. Increase radio A's transmit power by 10% (configurable) of the maximum allowed transmit power on the channel in the given regulatory domain.
      ii. Reset the timer to process radio A in the future.

In some embodiments, the RRM engine 304 employing the method determines the best transmit power for each radio by looking at the interference that each radio sees on its channels. Ideally, every radio would use its maximum transmit power allowed per local regulations—however when two radios are near each other—and using the same channel—then limiting transmit power on one or more of the radios can help mitigate interference. The RRM engine 304 then determines the priority for each radio by using a client list for each radio and retrieving their priority from the RRM database 314 as described above under Prioritization Scheme.

In some embodiments, the method loops through all radios in priority order from highest to lowest priority to select the best transmit for each radio. As a transmit power is selected for a radio, this may cause surrounding radios to have different interference patterns—for instance, if two radios are near each other, and R1 and R1 are both using the same channel, and R1 transmit power increases, this may cause R2 to see more interference. In some embodiments, the method adds weights to the interference by higher priority radios so that these radios are more likely to have a higher transmit power. When all radios have been processed, the RRM system 100 employing the method configures the new transmit power to each radio.

Example of Channel Performance Algorithm

In some embodiments, determining the channel performance of a radio 120 of an AP 110 by the channel performance module 320 includes any of the following performance determining steps: calculating the effect of neighbor APs 110 on the channel performance; calculating the effect of rogue neighbor APs 110 on the channel performance; computing the decrease in performance due to client TX & PHY errors; computing performance decrease due to spectral interference; accounting for consequences of radar interference; calculating the effect of utilization on channel performance; and/or modifying channel performance based on previous estimates of channel performance. The channel performance module 320 evaluates channel performance in terms of a quantity called "Performance Measure" (PM), which has a numeric value whose magnitude directly characterizes performance of a channel. The higher the performance measure, the better is the channel performance. The channel performance module 320 initializes the PM of each channel at 100% and subsequently adjusts the PM based on the outcome of the performance determining steps. The RRM engine 304 using the cost-benefit module 322 and channel selection module 324 further evaluates channels with a performance measure value better than the radio's current channel.

AP Neighbor Count

In some embodiments, the channel performance module 320 calculates an AP's neighbor count to determine the effect of neighbor APs on the AP's channel performance, since the performance of a radio channel is significantly affected by other nearby radios handling traffic on the same channel. In some embodiments, the network APs periodically send information about neighbor APs to the RRM system 100 in the form of neighbor messages. These messages include data about neighbor APs, including radios, BSSID, channels, BSSID of neighbor APs, RSSI and other relevant info used for determining the channel performance. The AP data collection module 308 stores this information in the RRM database 314.

Initially, the channel performance module 320 sets the neighbor count to zero. To retrieve the neighbor APs of a channel, the channel performance module 320 queries the RRM database 314 for a neighbor list by matching the APs BSSID, radio type and channels. The neighbor list includes a list of BSSIDs associated with network APs that interfere with the channel of the AP, for which the channel performance module 320 determines its channel performance. Upon receiving the neighbor list, the channel performance module 320 looks up the BSSID list in the RRM database 314 to resolve the neighbor BSSIDs to corresponding APs. For each BSSID mapped to an AP the channel performance module increments the neighbor count by one. If multiple BSSID entries in the neighbor list map to the same AP, the channel performance module 320 only once increments the neighbor count by one and eliminates duplicate entries form the neighbor list.

Since neighbor APs directly interfere with an AP's channel performance, neighbor APs are considered the primary AP neighbors of an AP's channel. In some embodiments, neighbor APs of the primary AP neighbors on the same channel also affect the channel performance by indirectly increasing the interference through the primary neighbors. Neighbor APs of primary AP neighbors are referred to as secondary AP neighbors. In some embodiments, the channel performance module 320 also accounts for the effect of secondary AP neighbors on channel performance. To identify secondary AP neighbors of every primary neighbor AP, the channel performance module 320 retrieves the neighbor list for the channel from the RRM database 314 and BSSIDs are mapped to APs in the same manner as described above. Any of the mapped APs are included in the secondary neighbor count except for previously identified primary AP neighbors and the AP currently being evaluated for channel performance.

The channel performance module 320 reduces the PM of a channel by a first percentage value (A %) for every counted primary AP neighbor and by a second percentage value (B %) for every counted secondary AP neighbor.

Rogue AP Neighbor Count

In some embodiments, the channel performance module 320 calculates an AP's rogue neighbor count to determine the effect of non-network neighbor APs on the AP's channel performance. While resolving the BSSIDs in the neighbor list to the BSSIDs of APs in the RRM database 314, the channel performance module 320 identifies any BSSID entries that do not map to any APs included in the network, which are either part of other networks or have not yet joined the network. These neighbor APs are referred to as "rogue" AP neighbors. Similar to non-rogue AP neighbors, as described above, the channel performance module distinguishes between primary rogue AP neighbors and secondary rogue AP neighbors. The channel performance module sets the initial count for each type of rogue neighbors to zero and then increments the count by one for each identified rogue AP neighbor. The channel performance module reduces the PM of a channel by a third percentage value (C %) for every counted primary rogue AP neighbor and by a fourth percentage value (D %) for every counted secondary rogue AP neighbor.

Client TX and PHY Errors

In some embodiments, the channel performance module 320 decreases the channel performance based on client information, including client errors, which APs 110 periodically report to the RRM system 100. Errors encountered by the clients 130 provide an estimate of the quality of a channel. Channel performance degrades with higher number of client errors as the higher number indicates an increased amount of interference in the channel. The channel performance module 320 accounts for client TX and PHY errors by reducing the PM of a channel by a fifth percentage value (E %) for each client error reported to the RRM system 100.

Spectral Interference

In some embodiments, the channel performance module 320 decreases the channel performance based on spectral interference in a channel by other radio-wave transmitting device. Spectral interference represents interference caused by devices other than APs and AP radios, e.g., microwave ovens, Bluetooth devices, wireless game controllers and the like. The presence of such devices in a radio's vicinity sometimes affects the radio's channel performance. In some embodiments, an AP 110 sends channel information to the RRM system 100 that includes information regarding any spectral interference detected by the AP 110. This information is represented in the form of RSSI and duty cycle corresponding to the time period that the interference was active. The interference information is stored in the RRM database 314, associated with the corresponding AP identifier (ID), radio ID and channel ID, and later used for estimating the change in performance. Upon the AP timer 316 expiring, the channel performance module 320 queries the database based on the AP ID, radio ID and channel ID to retrieve the spectral interference information. The channel performance module 320 adjusts the channel's PM by a weight percentage based on the detected intensity of every type of interference and the number of channels/sub-channels that are affected.

Radar Interference

Figure 10:
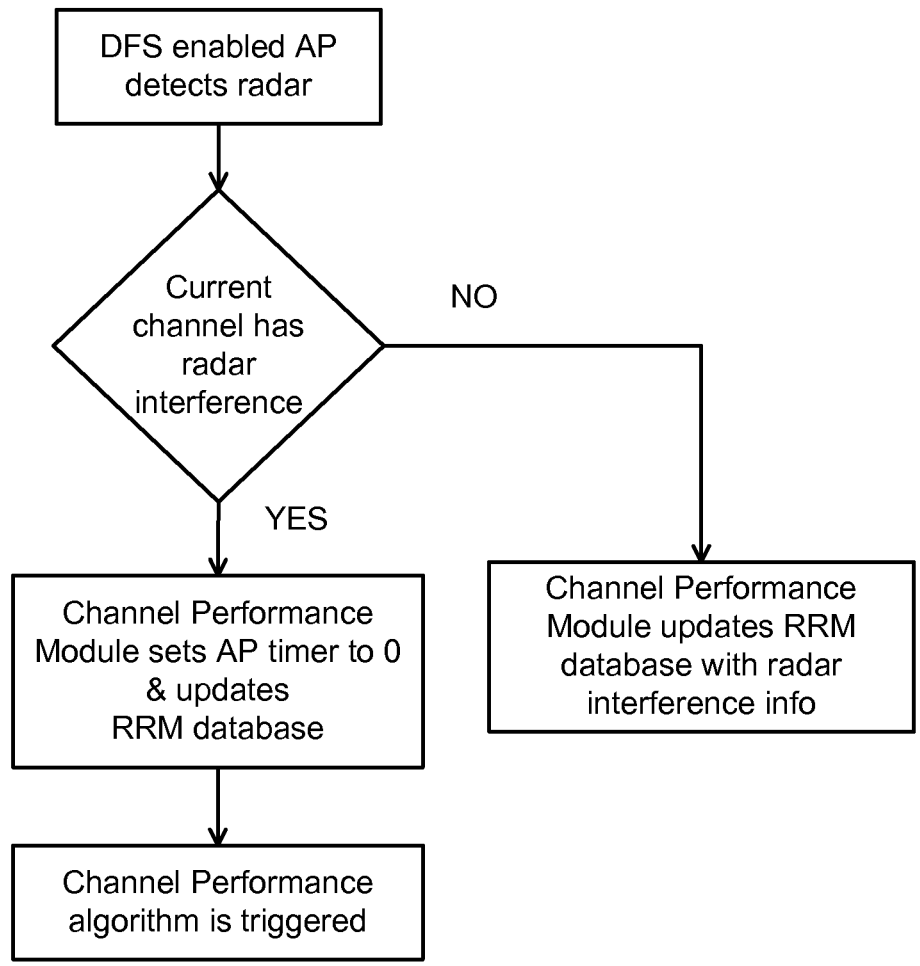
FIG. 10 illustrates a flowchart of a method for determining radar interference in a wireless network of AP radios, according to some embodiments.

In some embodiments, as illustrated in FIG. 10, the channel performance module 320 decreases the channel performance based on radar interference in a channel. Dynamic Frequency Selection (DFS) enables radios to continuously monitor their operating (current) channels for radar signals. In some embodiments, if the radio detects radar signals on the channel, the radio blocks further transmissions on that channel and switches to another channel that experiences no radar interference. In some embodiments, if an AP 110 detects radar interference, the AP 110 reports the information to RRM system 100, which stores the radar information in the RRM database 314 and resets the AP timer 316 to zero if any of its radios' current channel experiences the radar interference. Upon resetting the AP timer 316, the channel performance module 320 recalculates the channel performance for all radios 120 and channels of the AP 110. This includes channel performance module 320 querying the RRM database 314 for a list of channels that are affected by radar signals. For each channel in the list received from the RRM database 314, the channel performance module 320 sets the channel's PM to zero, thereby labelling the channel unusable. Upon identifying a channel being unusable, the channel performance module 320 skips any further performance determining steps and starts evaluating the AP's remaining channels experiencing no radar interference.

Channel Utilization

In some embodiments, the channel performance module 320 reduces the channel performance based on increased utilization of a channel, since a channel's performance degrades when its utilization intensifies. The channel performance module 320 retrieves the utilization data of a channel, e.g., idle percentage (% X), data percentage (% Y), and interference percentage (Z %). The idle percentage represents the amount of time that a channel was idle while the channel was monitored. The data percentage represents the amount of time that a channel was handling traffic with the channel's clients via, e.g., 802.11 while being monitored. Higher values of data and interference percentages indicate a higher utilization of the channel, while a higher idle percentage indicates a lower utilization. Since a higher channel utilization limits channel performance, the channel performance module reduces the PM of a channel by a sixth percentage value (F %) based on data and interference percentage that are offset by the idle percentage.

Time Prediction

Figure 11:
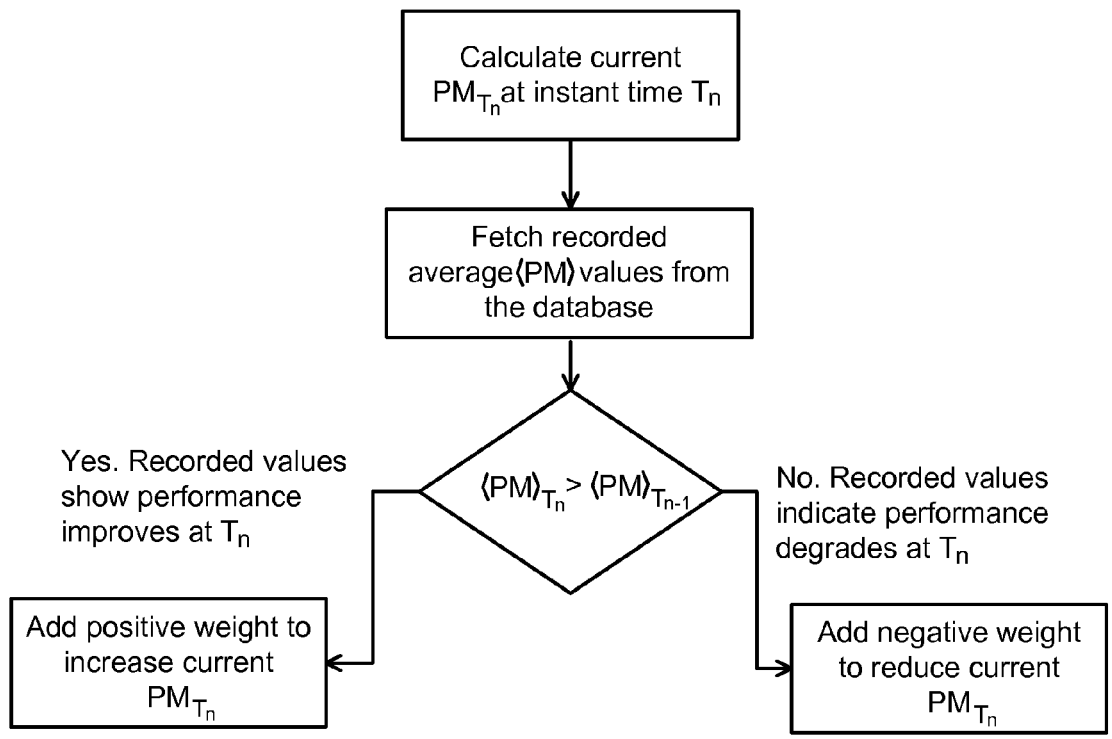
FIG. 11 illustrates a flowchart for determining channel performance using averaged performance measures, according to some embodiments.

In some embodiments, as illustrated in FIG. 11, the channel performance module 320 adjusts the channel performance based previously recorded PM values of a channel. The RRM engine 304, including the channel performance module 320, of an AP runs at periodic time intervals (after the AP timer 316 expires), computes a channel's PM values at end of these time intervals, and stores the PM values in the RM database 314. Channel performance module 320 uses the average PM value at the end of each time interval based on previously recorded PMs to predict the channel behavior by factoring the average into the current PM as weighted measure. To predict channel performance behavior at present time $T_n$, the channel performance module 320 calculates average of recorded values prior and close to the present time $T_n$. For every channel, channel performance module 320 queries the RRM database 314 to retrieve the list of recorded PM values. The channel performance module 320 calculates the averages $<PM>_{T_n}$ and $<PM>_{T_{n-1}}$ at present time $T_n$ and previous time $T_{n-1}$, respectively. If the average $<PM>_{T_n}$ at present time $T_n$ has improved compared to the average $<PM>_{T_{n-1}}$ recorded at previous time $T_{n-1}$, then the channel performance is likely better at the present time $T_n$. Hence, the channel performance module 320 adjusts the present PM by a positive weight. On the other hand, if the average $<PM>_{T_n}$ at present time $T_n$ has degraded compared to the average $<PM>_{T_{n-1}}$ recorded at previous time $T_{n-1}$, then the channel performance module 320 reduces the PM at present time $T_n$ using a negative weight.

For example, Table 5 shows the average channel performance <PM> of a channel calculated at different times ($T_1 \ldots T_5$). Based on this data, the channel performance module 320 identifies whether a channel's performance improves or degrades at any particular time. For example, the channel's performance degrades after time $T_2$ and switching to this channel after time $T_2$ is not preferable if better channels are available. In this case, channel performance module 320 reduces the PM of a channel by a weight percentage at times beyond time $T_2$. Utilizing PMs averaged over time helps in optimizing channel performance, since it accounts for fluctuating usage patterns in various geographical localities, e.g., residential and commercial areas, over particular time periods, e.g., weekdays and weekends.

TABLE 5

Performance Measure Data

| Time | Average PM in Percentage |
|---|---|
| $T_1$ | 60 |
| $T_2$ | 75 |
| $T_3$ | 50 |
| $T_4$ | 43 |
| $T_5$ | 37 |

Example of Channel Change Cost Algorithm

In some embodiments, the cost-benefit module 322 calculates the cost of switching the operating (current) channel of an AP radio to a better performing channel. Whenever an AP radio changes from a current channel to a new channel, clients 130 of the radio connected to the current channel are briefly disconnected. Clients 130 can either reconnect to the same AP radio (on its new channel), or roam to a nearby AP and connect to radio of the nearby AP. Thus, the cost of changing channels includes the unwanted disruption in client communication until the client connects back to an AP. The cost-benefit module 322 evaluates the cost of changing a channel in terms of a quantity called "Cost Measure" (CM), which has a numeric value whose magnitude directly characterizes the cost involved in changing the channel. The cost-benefit module 322 initializes the CM of each channel at 0% and subsequently increases the CM based on the outcome of the following cost determining steps: estimating cost of disconnecting regular clients on the current channel; calculating cost of disconnecting high priority clients on the current channel; estimating cost of disconnecting high usage clients on the current channel; and/or computing the effect of channel change on neighbors of channel being switched to. CM equals the sum of the costs determined by performing these steps. The larger CM, the worse is the impact of changing the channel.

Client Drop Off (Disconnection) Cost

Figure 12:
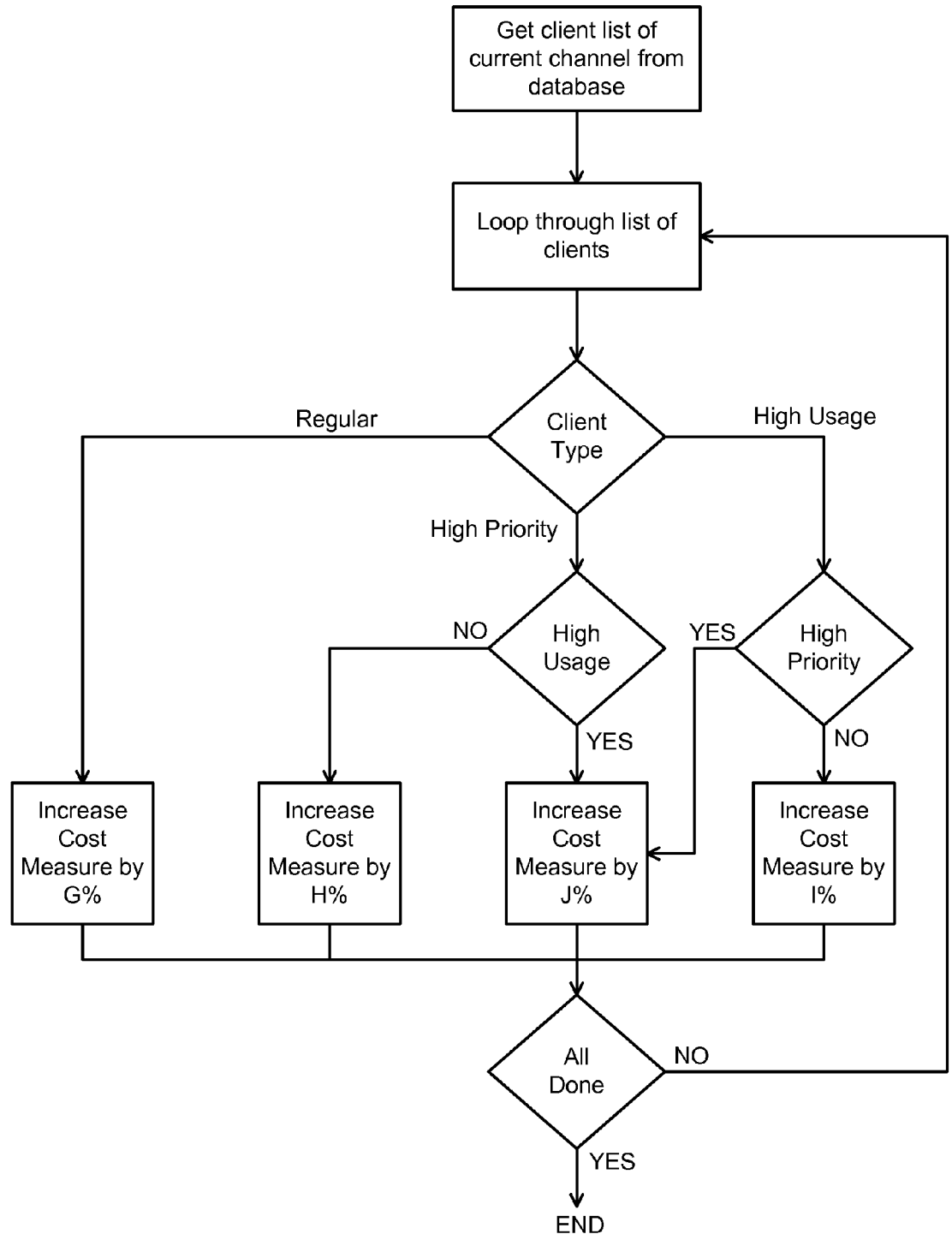
FIG. 12 illustrates a flowchart for calculating client drop off cost, according to some embodiments.

In some embodiments, as illustrated in FIG. 12, the cost-benefit module 322 determines the cost for clients being dropped off (disconnected) if a channel of an AP radio is changed. The cost-benefit module 322 accounts for the service disruption to the client and imposes a cost based on the type of clients experiencing the disruption, e.g., regular clients, high priority clients, high usage clients, or high priority/high usage clients. The cost-benefit module 322 uses a client list to identify the client type and retrieves the corresponding priority value from the RRM database 314. The RRM engine 304 assigns priority to a client when the client first joins the network based on the client's priority SSID profile as described above under Prioritization Scheme. In some embodiments, a RADIUS server is used to assign priorities to clients during the client's authentication process with the network.

Priorities are assigned to clients 130 in a manner that reduces the probability of high priority clients being dropped from the network when determining which channels to switch. Thus, based on client priorities high priority clients are less likely to be dropped from the network, since the cost of switching channels serving high priority clients is significantly higher than channels serving other clients. Clients 130 are referred to as regular clients, if the clients 130 are associated with low or no priority with the RRM database 314 storing priority values of clients. The cost-benefit module 322 increases the CM of a channel by a seventh percentage value (G %) for every regular client serviced by the channel. The cost-benefit module 322 increases the CM of a channel by a eight percentage value (H %) for every high priority client serviced by the channel with H % being larger than G %.

Clients 130 are referred to as high usage clients, if the clients produce traffic exceeding a pre-defined traffic threshold value. In some embodiments, the pre-defined traffic threshold value is stored in the RRM database 314, from which it is retrieved by the cost-benefit module 322. Clients 130 are referred to high priority/high usage clients, if the clients are assigned high priorities and generate network traffic that exceeds the pre-defined traffic threshold value.

The cost-benefit module 322 gives preference to APs 110 based on utilization so that channels on less-utilized AP are more likely to be changed than channels on APs servicing high usage clients, since switching channels with high usage clients is more damaging to the network performance than channels servicing regular clients. Thus, the cost-benefit module 322 increases the CM of a channel by a ninth percentage value (I %) for every high usage client serviced by the channel with I % significantly larger than any other costs. Disrupting high priority/high usage clients during channel change causes an even larger impact on network performance than disrupting any other client type. Hence, the cost-benefit module 322 increases the CM of a channel by a tenth percentage value (J %) for every high priority/high usage client serviced by the channel with J % being larger than any other client cost (G %, H %, or I %).

Neighbors Performance

Figure 13:
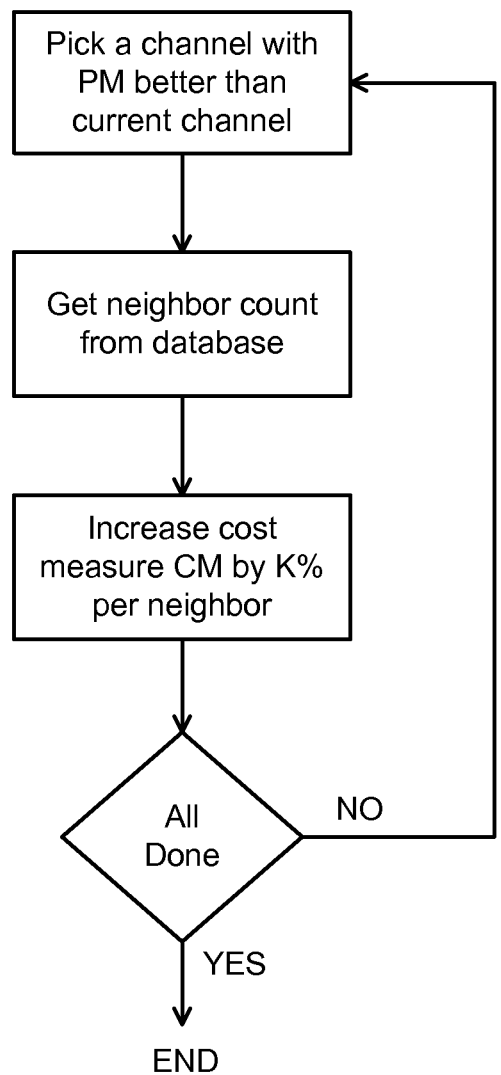
FIG. 13 illustrates a flowchart for estimating neighbor performance, according to some embodiments.

In some embodiments, as illustrated in FIG. 13, the cost-benefit module 322 determines the cost on the performance on neighbor APs when switching the channel of an AP radio. Switching an AP radio to a new channel means the AP of the radio becomes a neighbor to any neighbor APs operating on the new channel. As discussed with respect the channel performance algorithm, adding an AP to a channel will affect the performance of other APs operating on the same channel. The cost-benefit module 322 therefore accounts for the effect on the channel's neighbor AP's performance caused by the impending channel switch. Thus, for every better performing channel than current channel, the cost-benefit module 322 retrieves the neighbor AP list from the RRM database 314 and increases the CM of channel by an eleventh percentage value (K %) for every neighbor included in the list, which has its performance impacted by the channel switch. The total cost measure of switching to another channel will be equivalent to sum of the client cost measures of the current channel and the cost measure for affecting the neighbor's performance of the channel being switched to.

Example of Channel Selection Algorithm

In some embodiments, channel selection module 324 determines whether to instruct an AP 110 to switch one of its AP radios 120 to another channel for optimal performance.

The best channel is determined by calculating the channel usability of each channel, which is defined as follows:

Channel Usability=Performance Measure (PM)−Cost Measure (CM).

The channel usability is the performance measure of a new channel offset by the cost of changing the current (operating) channel to a new channel having a better PM value than the current channel. The channel usability represents the effectiveness with which a channel performs if selected as the operating channel. The channel selection module 324 estimates the channel usability for all the channels of an AP 110 and compares them with the PM value of the current channel. A channel having a usability value larger than current channel's PM value perform better than the current channel despite the cost of switching the channel. The channel selection module 324 selects the channel with the largest usability value that also exceeds the current channel's PM as the new operating channel. If none of the channels has a usability value larger than current channel's PM value, the channel selection module 324 selects the current channel as the operating channel.

Upon selecting the operating channel by the channel selection module 324, the RRM engine 304 resets and starts the AP timer 316 for a new monitoring cycle. If the selected operating channel is not as same as the current channel, the RRM engine 304 updates the channel changes in the RRM database 314 and the AP configuration module 310 pushes the channel change across the network to the AP 110 to switch channels. In addition, the RRM engine 304 adjusts the AP timers 316 of the neighbor APs. The AP timers 316 of the neighbor APs are adjusted so that their RRM engine 304 is delayed from running the RRM algorithm immediately. This prevents a domino effect whereby the neighbor APs react to the current AP's channel change by changing their own channels, which in turn would trigger network-wide channel alterations. Adjusting the AP timers 316 of neighbor APs prevents such a domino effect and ensures stability of the network.

Computing Machine Architecture

Figure 14:
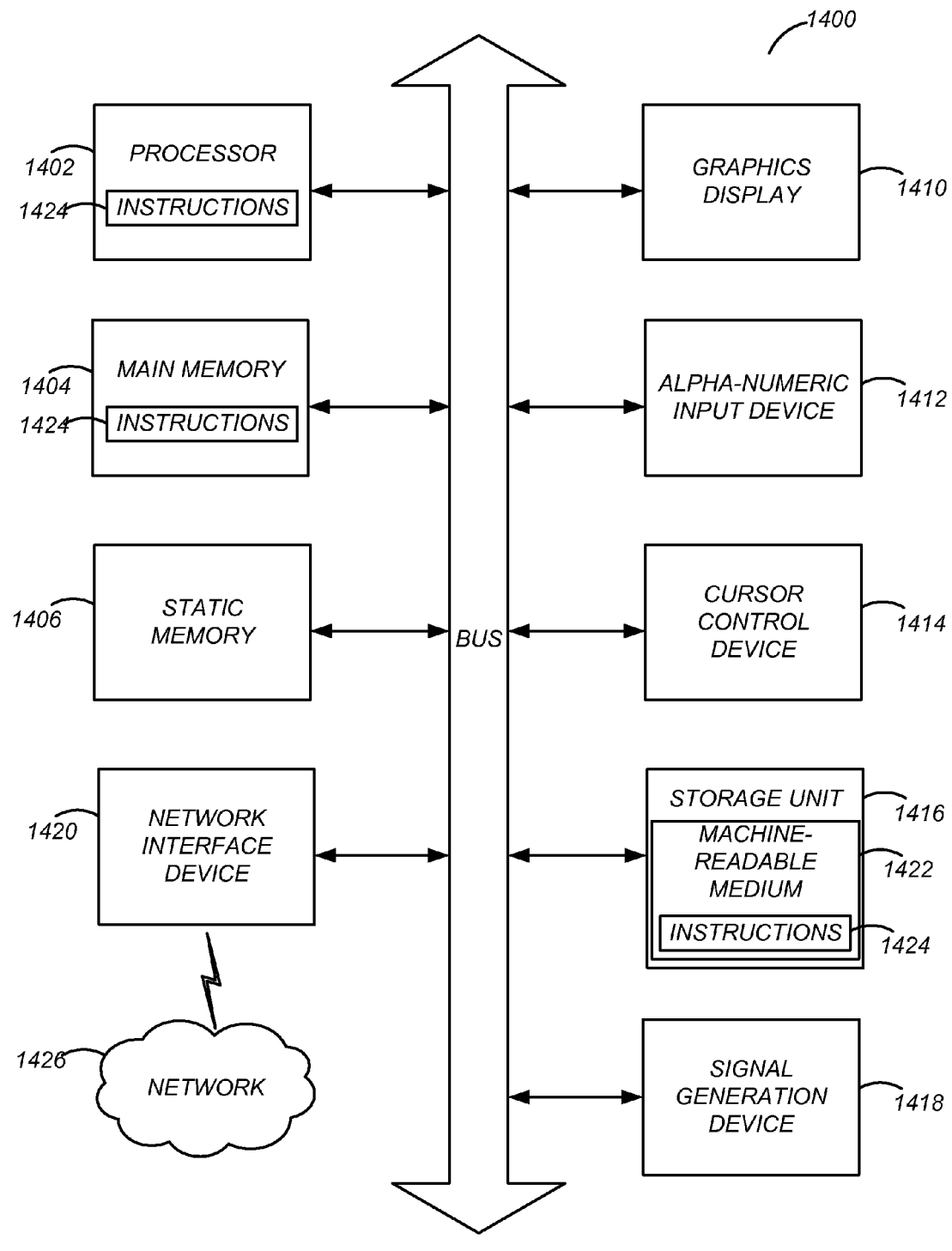
FIG. 14 illustrates one embodiment of components of an example machine able to read instructions from a machine-readable medium and execute them in a processor (or controller).

FIG. 14 is a block diagram illustrating components of an example machine able to read instructions from a machine-readable medium and execute them in a processor (or controller). Specifically, FIG. 14 shows a diagrammatic representation of a machine in the example form of a computer system 1400 within which instructions 1424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes a processor 1402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 1408. The computer system 1400 may further include graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a storage unit 1416, a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 (e.g., software) may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 (e.g., software) may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store instructions (e.g., instructions 1424). The term "machine-readable medium" shall also be taken to include any medium that is capable of storing instructions (e.g., instructions 1424) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, 3A, 3B, 4A, and 4B. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for managing radio channels and frequencies in a centralized management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for managing radio channels in a wireless network of radio access points, each radio access point comprising a radio, based on priorities of the radios, the method comprising:

selecting at least one radio of a radio access point, the at least one selected radio operating on a current channel;

for each selected radio:
  determining all within-range radios by scanning channels of the selected radio for signals from other radios of the radio access points;
  determining priorities of the selected radio and of the within-range radios;
  calculating a performance measure for each channel of the selected radio, the performance measure based at least partially on the priority of the selected radio and priorities of the within-range radios;
  calculating a cost of changing the current channel to a new channel of the selected radio, the new channel having a performance measure that exceeds the performance measure of the current channel, and the cost of changing the current channel comprising a technical impact of changing the channel on the selected radio; and
  in response to determining that the performance measure of the new channel exceeds the cost of changing the current channel to the new channel, sending a request for changing the current channel to the new channel to the radio access point of the selected radio.

2. The method of claim 1, wherein the priority of each radio is based at least partially on priorities of clients connected to the radio.

3. The method of claim 1, wherein the priority of each radio equals a sum of priorities of clients connected to the radio.

4. The method of claim 1, further comprising:
receiving data from the radios of the radio access points, the data comprising operational properties of the radios.

5. The method of claim 4, further comprising:
starting a timer for each radio access point included in the wireless network;
in response to the timer of one of the radio access points expiring, the selecting of a radio of a radio access point comprising selecting the radio of the radio access point that has the expired timer.

6. The method of claim 5, further comprising:
in response to the timer of one of the radio access points expiring, restarting the expired timer.

7. The method of claim 4, wherein the calculating of the performance measure for each channel of the selected radio is based at least partially on the received data from the selected radio.

8. The method of claim 1, wherein the performance measure of the new channel exceeds the performance measures of all other channels of the selected radio.

9. The method of claim 1, wherein selecting at least one radio of a radio access point comprises selecting all radios of the radio access point.

10. The method of claim 1, wherein the within-range radios have a coverage area that partially overlaps with a coverage area of the at least one selected radio.

11. The method of claim 1, wherein the cost of changing the current channel to the new channel is based at least partially on a cost of dropping clients that are connected to the selected radio on the current channel.

12. The method of claim 1, wherein the cost of changing the current channel to the new channel is based at least partially on a cost of interfering with a neighbor radio included in the network.

13. The method of claim 12, wherein the neighbor radio comprises one of the within-range radios.

14. The method of claim 1, wherein the performance measure of each channel is based at least partially on interferences of the channel from unknown radio sources, from radios not included in the network, from radios included in the network, and from any combination thereof.

15. A computer-implemented method for managing radio transmit powers in a wireless network of radio access points, each radio access point comprising a radio, based on priorities of the radios, the method comprising:
selecting at least one radio of a radio access point, the selected radio operating on a current channel with a current transmit power;
for each selected radio:
  determining all within-range radios by scanning the current channel of the selected radio for signals from other radios of the radio access points;
  determining priorities of the selected radio and of the within-range radios;
  processing at least one of the within-range radios;
  for each processed within-range radio:
    in response to the priority of the selected radio exceeding the priority of the processed within-range radio, determining a first amount by which to increase the current transmit power of the selected radio and, in response to the determined first amount exceeding zero, sending a request for increasing the current transmit power of the selected radio by the determined first amount;
    in response to the priority of the processed within-range radio exceeding the priority of the selected radio, determining a second amount by which to decrease the current transmit power of the selected radio and, in response to the determined amount exceeding zero, sending a request for decreasing the current transmit power of the selected radio by the determined amount.

16. The method of claim 15, wherein the first amount by which to increase the current transmit power is based on clients connected to the selected radio, the clients having high priority and being located at edges of signal range of the selected radio.

17. The method of claim 15, wherein the first amount by which to increase the current transmit power is based on an amount in increase of bandwidth to clients that have low signal level and are connected to the selected radio.

18. The method of claim 15, wherein the second amount by which to decrease the current transmit power is based on a number of client connections that are terminated by decreasing the current transmit power.

19. The method of claim 15, wherein the second amount by which to decrease the current transmit power is based on a cost of reducing coverage area of the selected radio.

20. The method of claim 15, wherein at least one of the first amount by which to increase the current transmit power and the second amount by which to decrease the current transmit power is based on a pre-defined percentage of a maximum transmit power of the selected radio.

21. The method of claim 20, wherein the pre-defined percentage is 10% of the maximum transmit power of the selected radio.

22. The method of claim 15, wherein the first amount by which to increase the current transmit power is based on a client coverage hole count that exceeds a pre-defined coverage hole threshold.

23. The method of claim 15, further comprising:
receiving data from the radios of the radio access points, the data comprising operational properties of the radios; and wherein at least one of the first amount by which to increase the current transmit power and the second amount by which to decrease the current transmit power is based on the received data from the selected radio and the processed within-range radio.

24. The method of claim 15, further comprising:
starting a timer for each radio access point included in the wireless network; and
in response to the timer of one of the radio access points expiring, the selecting of a radio of a radio access point comprising selecting the radio of the radio access point that has the expired timer.

25. The method of claim 24, further comprising:
in response to the timer of one of the radio access points expiring, restarting the expired timer.

26. The method of claim 15, wherein the processing of at least one of the within-range radios comprises processing all within-range radios from highest to lowest priority.

27. The method of claim 26, further comprising: in response to the determined amount exceeding zero, stopping the processing of all within-range radios from highest to lowest priority.

28. A computer-implemented method for managing radio resources in a wireless network comprising a plurality of radios, the method comprising:
forming a hierarchy comprising a plurality of nodes by:
generating a tree structure having a root node and at least one node of the plurality of nodes connected to the root node;
assigning each node to be a child node or a parent node, each parent node being configured to manage radio resources of a child node connected to the parent node of the child node, wherein at least two nodes of the plurality of nodes are assigned to be parent nodes, and
associating each radio of the wireless network to one node of the plurality of nodes;
selecting a radio of the wireless network;
determining all neighboring radios of the wireless network that are within range of the selected radio, the neighboring radios including at least two parent nodes; and
in response to determining all neighboring radios of the selected radio:
identifying all parent nodes associated with the selected radio and with all neighboring radios,
selecting one node from all the identified parent nodes so that the selected parent node has the smallest number of child nodes among all identified parent nodes, and
managing radio resources of the one radio and all neighboring radios through the selected parent node.

29. The method of claim 28, wherein the plurality of nodes comprises one parent node and one child node, the parent node being the root node.

* * * * *